US012742108B2

(12) United States Patent
Terashita et al.

(10) Patent No.: US 12,742,108 B2
(45) Date of Patent: Sep. 22, 2026

(54) THERMALLY CONDUCTIVE SILICONE COMPOSITION AND METHOD FOR PRODUCING GAP FILLER USING SAID COMPOSITION

(71) Applicant: WACKER CHEMIE AG, Munich (DE)

(72) Inventors: Nazuna Terashita, Chikusei (JP); Yukihiko Asakawa, Chikusei (JP); Kazuya Sakai, Chikusei (JP); Yusuke Suzuki, Chikusei (JP); Taishi Uchida, Chikusei (JP)

(73) Assignee: Wacker Chemie AG, Munich (DE)

( * ) Notice: Subject to any disclaimer, the term of this patent is extended or adjusted under 35 U.S.C. 154(b) by 77 days.

(21) Appl. No.: 18/696,504

(22) PCT Filed: Aug. 17, 2022

(86) PCT No.: PCT/JP2022/031105

§ 371 (c)(1),
(2) Date: Mar. 28, 2024

(87) PCT Pub. No.: WO2023/053760

PCT Pub. Date: Apr. 6, 2023

(65) Prior Publication Data

US 2024/0392175 A1 Nov. 28, 2024

(30) Foreign Application Priority Data

Sep. 30, 2021 (JP) ................................ 2021-162258
Sep. 30, 2021 (JP) ................................ 2021-162261
Sep. 30, 2021 (JP) ................................ 2021-162279

(51) Int. Cl.
*C09J 183/06* (2006.01)
*C09J 11/04* (2006.01)

(52) U.S. Cl.
CPC ............ *C09J 183/06* (2013.01); *C09J 11/04* (2013.01)

(58) Field of Classification Search
CPC ... C08K 3/36; C08K 3/22; C08K 5/56; C08K 5/5415; C08K 2201/001; C08K 2003/2296; C08K 2003/2227; C08K 2201/014; H01M 50/131; H01M 50/14; H01M 10/653; H01M 50/1245; H01M 50/126; H01M 50/119; H01M 10/625; C08L 83/04; C09J 183/06; C09J 11/04; C09J 2483/00; C09J 2203/33; C08G 77/16; C08G 77/12; C08G 77/20
See application file for complete search history.

(56) References Cited

FOREIGN PATENT DOCUMENTS

| | | | |
|---|---|---|---|
| JP | H07304955 | A | 11/1995 |
| JP | H07305046 | A | 11/1995 |
| JP | H08170019 | A | 7/1996 |
| JP | H08225742 | A | 9/1996 |
| JP | 2000080280 | A | 3/2000 |
| JP | 2000086765 | A | 3/2000 |
| JP | 2000086898 | A | 3/2000 |
| JP | 2000095864 | A | 4/2000 |
| JP | 2001139815 | A | 5/2001 |
| JP | 2001348483 | A | 12/2001 |
| JP | 2006089675 | A | 4/2006 |
| JP | 2007063389 | A | 3/2007 |
| JP | 2008546861 | A | 12/2008 |
| JP | 2010084107 | A | 4/2010 |
| JP | 2011153252 | A | 8/2011 |
| JP | 2013071961 | A | 4/2013 |
| JP | 2017210518 | A | 11/2017 |
| JP | 2019038969 | A | 3/2019 |
| JP | 2019077845 | A | 5/2019 |
| JP | 2019131734 | A | 8/2019 |
| JP | 2021001239 | A | 1/2021 |
| JP | 2021147431 | A | 9/2021 |
| JP | 2022029985 | A | 2/2022 |
| JP | 7368656 | B2 | 10/2023 |
| KR | 20080021673 | A | 3/2008 |
| KR | 20090111354 | A | 10/2009 |
| KR | 20210072066 | A | 6/2021 |
| WO | 2015155950 | A1 | 10/2015 |
| WO | 2018043270 | A1 | 3/2018 |
| WO | 2019021824 | A1 | 1/2019 |
| WO | 2019189512 | A1 | 10/2019 |
| WO | 2021012135 | A1 | 1/2021 |
| WO | 2021132345 | A1 | 7/2021 |
| WO | 2021132349 | A1 | 7/2021 |
| WO | 2021260279 | A1 | 12/2021 |
| WO | 2023194054 | A1 | 10/2023 |

*Primary Examiner* — Monica A Huson

(57) ABSTRACT

A two-component thermally conductive silicone composition long with methods of producing and uses for the same. Where the two-component thermally conductive silicone includes a first liquid containing (A) a diorganopolysiloxane having an alkenyl group bonded to a silicon atom, (D) an addition catalyst, (E) a thermally conductive filler, and (F) a condensation catalyst. Where the two-component thermally conductive silicone includes a second liquid containing (A) the diorganopolysiloxane having an alkenyl group bonded to a silicon atom, (B) a diorganopolysiloxane having a hydrogen atom bonded to a silicon atom, (C) at least one selected from (C-1) an organosilicon compound having two or more groups that are at least one selected from a methoxy group and an ethoxy group and not having a hydrocarbon group having 3 or more carbon atoms or a vinyl group, and (C-2) a hydrolysate of the organosilicon compound (C-1), and (E) the thermally conductive filler.

15 Claims, No Drawings

THERMALLY CONDUCTIVE SILICONE COMPOSITION AND METHOD FOR PRODUCING GAP FILLER USING SAID COMPOSITION

CROSS-REFERENCE TO RELATED APPLICATIONS

This application is a U.S. National Phase application of PCT Application NO. PCT/JP2022/31105 filed on Aug. 17, 2022, which is incorporated by reference herein in their entirety.

TECHNICAL FIELD

The present invention relates to a thermally conductive silicone composition containing a thermally conductive filler; at least one selected from an organosilicon compound having two or more groups that are at least one selected from a methoxy group and an ethoxy group and not having a hydrocarbon group having 3 or more carbon atoms or a vinyl group, and a hydrolysate of the organosilicon compound; and a condensation catalyst. The present invention also relates to a method for producing a gap filler using the composition.

BACKGROUND ART

As electronic components become smaller, higher in performance, and higher in output, the emitted thermal energy tends to increase, and the temperature of the electronic components tends to increase. In recent years, along with the popularization of electric vehicles, high-performance batteries have been developed. In view of this background, various heat-dissipating silicone products have been developed for transferring heat generated by a heat generating body such as electronic components and batteries to a heat dissipation member such as a heat sink.

The heat-dissipating silicone products can be roughly classified into those provided in a sheet form such as a heat dissipation sheet and those provided in a liquid form or a pasty form such as a gap filler, a heat dissipation oil compound, or a heat dissipation grease.

The heat dissipation sheet is a flexible and highly thermally conductive silicone rubber sheet obtained by curing a thermally conductive silicone composition into a sheet form. Therefore, such a heat dissipation sheet can be easily installed to come into close contact with the surface of a component, thereby enhancing the heat dissipation properties. However, the heat dissipation sheet cannot conform to a component having a complicated shape or a material having a large surface roughness, and there is a possibility that minute voids are generated at the interface.

On the other hand, the gap filler is obtained by applying a thermally conductive silicone composition in a liquid or paste form directly to a heat generating body or a heat dissipating body, and curing the composition after application. Therefore, the use of a gap filler is advantageous in that even when the filler is applied to a complicated irregular shape, voids will be filled and a high heat dissipation effect will be exhibited.

In order for the gap filler to exhibit a higher heat dissipation effect, it is necessary to improve the thermal conductivity of the gap filler and to improve the adhesion and adhesive properties in the contact interface between the heat generating body or the heat dissipating body and the gap filler.

For example, Patent Literature 1 aims to provide a thermally conductive silicone composition that is used as a heat-dissipating member and has excellent thermal conductivity and water resistance, and favorable adherence during packaging, and to also provide a cured product thereof. The aim is achieved by the thermally conductive silicone composition including an organopolysiloxane as a base polymer and containing aluminum nitride and crushed alumina, wherein the crushed alumina collectively accounts for 60 to 95% by mass of the thermally conductive silicone composition. Patent Literature 1 discloses that the composition is cured at temperatures of 100° C. to 140° C.

However, Patent Literature 1 fails to disclose or suggest expression of adhesive properties under a vibration condition. Furthermore, the thermally conductive silicone composition is not suitable for a heat-dissipating material for an in-vehicle battery because heating at high temperature for curing is needed. Patent Literature 1 fails to disclose or suggest that properties of the thermally conductive silicone composition are exerted even when the thermally conductive silicone composition is formed or cured at normal temperature.

Patent Literature 2 discloses that when a liquid epoxy resin is mixed in an elastomer, an electrically insulating layer that is resistant to warping and has excellent adhesion strength to a metal layer at low temperature is obtained. However, the electrically insulating layer is not suitable for a heat-dissipating material for an in-vehicle battery since heating at high temperature for curing is needed. Patent Literature 2 fails to disclose or suggest expression of adhesive properties under a vibration condition.

Patent Literature 3 discloses that adherence is enhanced by mixing a curing agent and a binder resin such as an epoxy resin with silver powder having a predetermined particle diameter. A composition in Patent Literature 3 is not suitable for a heat-dissipating material for an in-vehicle battery since heating at high temperature for curing is needed. Patent Literature 3 fails to disclose or suggest expression of adhesive properties under a vibration condition. Since the silver powder is used as a filler, the composition is expensive and is not suitable for applications requiring insulating properties.

CITATION LIST

Patent Literature

PTL 1: Japanese Patent Application Laid-Open No. 2017-210518

PTL 2: Japanese Patent Application Laid-Open No. 2019-038969

PTL 3: Domestic Re-publication of PCT international application No. 2019/189512

SUMMARY OF INVENTION

Technical Problem

In recent years, there has been a problem that a gap filler applied to an interface of a battery unit housing or a cooler, of a battery mounted in an electric automobile, peels over time or voids are generated in the interface between the surface of the battery unit housing or the cooler and the gap filler because of some vibration from the automobile body. Therefore, a thermally conductive silicone composition for forming a gap filler having favorable adhesive properties under a vibration condition is required. The thermally conductive silicone composition also requires storage stability over a long period of time.

In such a circumstance, an object of the present invention is to provide a thermally conductive silicone composition that has favorable storage stability, can maintain favorable adhesive properties to a substrate such as a heat generating body or a heat dissipating body under a vibration condition, has high thermal conductivity, and thus provides a thermally conductive member (gap filler) having excellent heat dissipation properties.

Solution to Problem

The present inventors have found that by a thermally conductive silicone composition containing an organopolysiloxane in which at least one selected from an organosilicon compound having two or more groups that are at least one selected from a methoxy group and an ethoxy group and not having a hydrocarbon group having 3 or more carbon atoms or a vinyl group and a hydrolysate of the organosilicon compound, and a condensation catalyst are mixed, the object of the present invention can be achieved. Thus, the present invention has been completed.

That is, the present invention is a thermally conductive silicone composition containing:

(A) a diorganopolysiloxane having an alkenyl group bonded to a silicon atom;

(B) a diorganopolysiloxane having a hydrogen atom bonded to a silicon atom;

(C) at least one selected from

- (C-1) an organosilicon compound having two or more groups that are at least one selected from a methoxy group and an ethoxy group and not having a hydrocarbon group having 3 or more carbon atoms or a vinyl group, and
- (C-2) a hydrolysate of the organosilicon compound (C-1);

(D) an addition catalyst;

(E) a thermally conductive filler; and (F) a condensation catalyst.

The thermally conductive silicone composition of the present invention (hereinafter which may be simply referred to as a composition) is a composition for forming a thermally conductive member disposed on a surface of a heat generating body or a substrate of a cooler or the like. Examples of a form of the thermally conductive member include a gap filler.

A thermally conductive filling material-containing curable silicone composition of the present invention has high thermal conductivity and is usually cured at high temperature and/or cured without a high-temperature treatment. Even under a vibration condition, a cured product thereof can exhibit adhesive properties to a substrate such as a metal, an organic resin, or the like with sufficient adhesion strength in practical circumstances. Therefore, even under a vibration condition, the cured product is less likely to peel off of the surface of the substrate or voids are less likely to be generated in an interface between the cured product and the substrate. A thermally conductive member (gap filler) having favorable heat dissipation properties can thus be obtained.

In the thermally conductive silicone composition of the present invention, the diorganopolysiloxane having an alkenyl group bonded to a silicon atom (A) and the diorganopolysiloxane having a hydrogen atom bonded to a silicon atom (B) are subjected to a cross-linking reaction in the presence of the addition catalyst (D). Curing by the cross-linking reaction successfully proceeds even at normal temperature. The thermally conductive filler (E) is dispersed in a network structure formed by the cross-linking reaction, and a thermally conductive member having favorable thermally conductivity is formed.

In the present invention, at least one (C) selected from the organosilicon compound (C-1) having two or more groups that are at least one selected from a methoxy group and an ethoxy group and not having a hydrocarbon group having 3 or more carbon atoms or a vinyl group and the hydrolysate (C-2) of the organosilicon compound is hydrolyzed to produce a silanol. The produced silanol is reacted with and bonded to a condensable group (e.g., a hydroxyl group, an alkoxy group, or an acid group) present on a surface of various substrates. In this case, the hydrolysis of the component (C) and the production of the silanol are promoted by the condensation catalyst (F), the reaction and bonding of the silanol of the component (C) with the condensable group on the substrate are further promoted. As a result, adhesion of the curable silicone composition to various substrates is successfully promoted even at normal temperature.

The component (C) is dispersed in the network structure. The component (C) is subjected to a dehydration-condensation reaction with a hydroxyl group present on a surface of the component (E) to cover a part or the entirety of the surface of the component (E). This improves the dispersibility of the component (E) in the network structure. That is, the component (C) contributes to both the condensation reaction with the substrate and covering the surface of the thermally conductive filler (E), and the component (C) reacted with the substrate also interacts with the surface of the component (E). Thus, the whole cured product containing the components (A), (B), and (D) is bonded to the surface of the substrate.

It is shown that the thermally conductive silicone composition of the present application in which the components (C) and (E) are dispersed in the network of the components (A), (B), and (D) and the components are integrated with one another due to the interaction is cured to provide a cured product having favorable rubber strength (tensile strength and elongation).

As described above, the thermally conductive silicone composition of the present invention exhibits favorable adhesive properties to the surface of the substrate due to curing and can form a thermally conductive member having favorable tensile strength. Such a thermally conductive member exhibits high tensile shear bond displacement and high tensile shear bond stress. Therefore, even under a condition where the substrate is vibrated, a phenomenon where the thermally conductive member peels off of the substrate or where voids are generated between the thermally conductive member and the substrate is suppressed, and favorable heat dissipation properties can be maintained also under a vibration condition.

In addition, it is shown that the thermally conductive silicone composition has excellent storage stability and exhibits favorable adhesive properties under a vibration condition even after a two-component thermally conductive silicone composition is stored in an uncured state (i.e., in a state in which a first liquid and a second liquid are not mixed) for 1 week.

Advantageous Effects of Invention

Since the composition of the present invention has favorable storage stability, can maintain favorable adhesive properties to a surface of a substrate such as a heat generating body or a heat dissipating body under a vibration condition even after storage for a fixed period (for example, storage at 40° C. for 7 days), and has high thermal conductivity, and thus can provide a cured product (gap filler) having excellent heat dissipation properties due to high thermal conductivity, the composition is suitable as a thermally conductive silicone composition for production of a gap filler.

DESCRIPTION OF EMBODIMENTS

Hereinafter, a thermally conductive silicone composition, a method for producing the thermally conductive silicone composition, a method for producing a cured product (gap filler) using the thermally conductive silicone composition, and a method for improving the characteristics of the gap filler according to the present invention will be described in detail.

The thermally conductive silicone composition according to the present invention contains:

(A) a diorganopolysiloxane having an alkenyl group bonded to a silicon atom;

(B) a diorganopolysiloxane having a hydrogen atom bonded to a silicon atom;

(C) at least one selected from (C-1) an organosilicon compound having two or more groups that are at least one selected from a methoxy group and an ethoxy group and not having a hydrocarbon group having 3 or more carbon atoms or a vinyl group, and (C-2) a hydrolysate of the organosilicon compound (C-1);

(D) an addition catalyst;

(E) a thermally conductive filler; and (F) a condensation catalyst.

The thermally conductive silicone composition described above has favorable storage stability and exhibits high tensile shear bond stress that is the same as a case where the thermally conductive silicone composition is cured immediately after production (in a measurement test of tensile shear bond stress described below, the tensile shear bond stress is 0.10 MPa or more after storage for 24 hours and 7 days), and high tensile shear bond displacement (in a measurement test of tensile shear bond displacement, the displacement at the maximum stress is 0.30 mm or more after storage for 24 hours and 7 days) even when the thermally conductive silicone composition after storage in an uncured state for 7 days is applied to a substrate and cured. Therefore, even in an environment where the substrate is vibrated, a phenomenon where the cured product peels off of the substrate or where voids are generated between the cured product and the substrate is suppressed, and favorable bonding is possible. Thus, favorable heat dissipation properties can be maintained under a vibration condition.

The thermally conductive silicone composition of the present invention is a composition for forming a thermally conductive member, and examples of the thermally conductive member include a gap filler and a heat-dissipating sheet that are applied to a heat generating body such as a battery of an automobile, and the like, or to a filter covering the heat generating body.

The thermally conductive silicone composition of the present invention in a liquid state may be applied to a substrate before curing, followed by curing, to provide the thermally conductive member. Alternatively, the thermally conductive silicone composition may be cured to form the thermally conductive member, and the thermally conductive member may be applied to a substrate.

A temperature, a procedure, and the like for curing the thermally conductive silicone composition according to the present invention can be appropriately selected according to applications and the like for a cured product to be obtained, and are not limited. The present invention is characterized by providing the thermally conductive silicone composition that exerts sufficient performance, that is, sufficient curing properties and adhesive properties to a substrate under a vibration condition even when the composition is restricted to use in a normal temperature environment. However, curing in a high-temperature environment may be not excluded when such an environment is permitted.

A process for curing the thermally conductive silicone composition is preferably an addition reaction process. This is because curing can be controlled at various temperature ranges of from room temperature to about 150° C., the volume is less likely to be changed, a desorption gas is less likely to be generated, and the affinity for a thermally conductive filing material is generally good. In general, as the curing temperature is higher, curing is faster. In the present invention, it is assumed that a part or the whole of a process of adapting the thermally conductive silicone composition, a process of curing the composition, and a subsequent process requires a normal-temperature process by various restrictions depending on applications, a curing temperature that accounts for this assumption can be set. When adhesive properties are required in an application, curing by an addition reaction process is generally preferable because a diorganopolysiloxane having a hydrogen atom bonded to a silicon atom may contribute to adhesive properties in many cases.

Hereinafter, respective components of the thermally conductive silicone composition when the process for curing the thermally conductive silicone composition according to the present invention is an addition reaction process will be described in detail.

Component (A):

The component (A), which is the main component of the thermally conductive composition, is a diorganopolysiloxane having an alkenyl group bonded to a silicon atom.

The viscosity and the degree of polymerization of the component (A), which are not limited to particular values, can be selected according to the required mixing viscosity of the thermally conductive composition. For example, the component (A) may have a viscosity, at 25° C., of 10 mPa·s or more and 10,000 mPa·s or less.

As the diorganopolysiloxane, one type thereof may be used alone, or two or more types thereof may be used in combination as appropriate. The diorganopolysiloxane is the main component of the thermally conductive composition and has at least two alkenyl groups bonded to a silicon atom within one molecule on average, preferably 2 to 50 alkenyl groups, and more preferably 2 to 20 alkenyl groups.

The component (A) does not have a specifically limited molecular structure, and may have, for example, a linear structure, a partially branched linear structure, a branched chain structure, a cyclic structure, or a branched cyclic structure. Among these, the component (A) is preferably a substantially linear organopolysiloxane, and specifically, the component (A) may be a linear diorganopolysiloxane in which the molecular chain is mainly composed of a diorganosiloxane repeat unit and of which both terminals of the molecular chain are blocked with a triorganosiloxy group. Some or all of the molecular chain terminals, or some of the side chains, may be a silanol group.

The position of the alkenyl group bonded to the silicon atom in the component (A) is not particularly limited, and the component (A) may be a diorganopolysiloxane having an alkenyl group bonded to a silicon atom at both the molecular chain terminals. The organopolysiloxane having an alkenyl group bonded to both molecular chain terminals, one at each terminal, is advantageous since the content of alkenyl groups, which serve as reaction sites for cross-linking reaction, is low, and flexibility of the gap filler obtained after curing is increased.

The alkenyl group may be bonded to the silicon atom at the molecular chain terminal, to the silicon atom at a non-terminal molecular chain site (in the middle of the molecular chain), or to both.

The component (A) may be a polymer composed of a single type of siloxane unit or a copolymer composed of two or more types of siloxane units.

The viscosity of the component (A) at 25° C. is 10 mPa·s or more and 10,000 mPa·s or less, preferably 20 mPa·s or more and 5,000 mPa·s or less, and more preferably 30 mPa·s or more and 2,000 mPa·s or less.

When the viscosity thereof falls within the above-mentioned viscosity range, the obtained thermally conductive composition can exhibit the appropriate fluidity, and thus the dischargeability can be increased and the productivity can be increased. In addition, it is possible to increase the flexibility of a thermally conductive member obtained by curing the thermally conductive composition.

In order to adjust the viscosity (mixing viscosity), before curing, of the thermally conductive composition that is obtained by mixing the liquid compositions, two or more types of diorganopolysiloxanes having an alkenyl group and having different viscosities can also be used in combination.

In order to ensure both appropriate fluidity of the thermally conductive silicone composition and flexibility of the thermally conductive member obtained by curing the composition, the component (A) preferably contains no diorganopolysiloxane having a viscosity, at 25° C., of 100,000 mPa·s or more, and more preferably does not contain 0.1 parts by mass or more of the diorganopolysiloxane having a viscosity of 50,000 mPa·s or more relative to 100 parts by mass of the total amount of the components (A) and (B).

Specifically, the component (A) is represented by the following general formula (1) as an average composition formula:

$$R^1_aSiO_{(4-a)/2} \quad (1)$$

(In the formula (1), $R^1$s are the same as or different from each other and each are an unsubstituted or substituted monovalent hydrocarbon group having 1 to 18 carbon atoms, a is 1.7 to 2.1, preferably 1.8 to 2.5, and more preferably 1.95 to 2.05).

In one embodiment, at least two or more of the monovalent hydrocarbon groups represented by the aforementioned $R^1$ are selected from alkenyl groups such as a vinyl group, an allyl group, a propenyl group, an isopropenyl group, a butenyl group, an isobutenyl group, a hexenyl group, and a cyclohexenyl group. Groups other than these groups are substituted or unsubstituted monovalent hydrocarbon groups having 1 to 18 carbon atoms. Specifically, the aforementioned $R^1$ is selected from an alkyl group such as a methyl group, an ethyl group, a propyl group, an isopropyl group, a butyl group, an isobutyl group, a tert-butyl group, a pentyl group, a neopentyl group, a hexyl group, a 2-ethylhexyl group, a heptyl group, an octyl group, a nonyl group, a decyl group, and a dodecyl group; a cycloalkyl group such as a cyclopentyl group, a cyclohexyl group, and a cycloheptyl group; an aryl group such as a phenyl group, a tolyl group, a xylyl group, a biphenyl group, and a naphthyl group; an aralkyl group such as a benzyl group, a phenylethyl group, a phenylpropyl group, and a methylbenzyl group; and a halogen-substituted or cyano-substituted alkyl group in which a part or all of hydrogen atoms in the above-described hydrocarbon groups have been substituted with a halogen atom, a cyano group, or the like, such as a chloromethyl group, a 2-bromoethyl group, a 3,3,3-trifluoropropyl group, a 3-chloropropyl group, and a cyanoethyl group.

$R^1$s to be selected preferably include a vinyl group, an allyl group, a propenyl group, an isopropenyl group, a 2-methyl-1-propenyl group, a 2-methylallyl group, and a 2-butenyl group as the two or more alkenyl groups required, and a vinyl group is particularly preferred. As $R^1$ other than the alkenyl group, a methyl group and a phenyl group are preferable, and a methyl group is particularly preferable. In addition, it is preferable that 70 mol % or more of $R^1$s be a methyl group, in consideration of physical properties and economical efficiency of the cured product, and normally, one in which 80 mol % or more of $R^1$s is a methyl group is used.

Examples of the molecular structure of the component (A) include a dimethylpolysiloxane with both molecular chain terminals blocked with a dimethylvinylsiloxy group, a dimethylsiloxane-methylphenylsiloxane copolymer with both molecular chain terminals blocked with a dimethylvinylsiloxy group, a dimethylsiloxane-methylvinylsiloxane copolymer with both molecular chain terminals blocked with a dimethylvinylsiloxy group, a dimethylsiloxane-methylvinylsiloxane-methylphenylsiloxane copolymer with both molecular chain terminals blocked with a dimethylvinylsiloxy group, a dimethylsiloxane-methylvinylsiloxane copolymer with both molecular chain terminals blocked with a trimethylsiloxy group, an organopolysiloxane composed of a siloxane unit represented by the formula: $(CH_3)_2ViSiO_{1/2}$, a siloxane unit represented by the formula: $(CH_3)_3SiO_{1/2}$, and a siloxane unit represented by the formula: $SiO_{4/2}$ (Vi in the formula represents a vinyl group), an organopolysiloxane in which part or all of the methyl groups in the above-mentioned organopolysiloxanes are substituted by an alkyl group such as an ethyl group or a propyl group, an aryl group such as a phenyl group or a tolyl group, and a halogenated alkyl group such as a 3,3,3-trifluoropropyl group, and mixtures of two or more of these organopolysiloxanes. From the viewpoint of enhancing elongation at the time of breakage of the cured product due to increased molecular chain length, a linear diorganopolysiloxane with a vinyl group at both molecular chain terminals is preferable.

The component (A) contains 5% by mass or more and 20% by mass or less of an alkenyl group-containing diorganopolysiloxane having at least one silanol group at the molecular chain terminal. When the thermally conductive silicone composition contains (H) hydrophobic silica to be described later, addition of the component (A) having a silanol group at the molecular chain terminal can suppress the settling of the filler (including (E) the thermally conductive filler and fillers other than the thermally conductive filler such as silica) during storage in the thermally conductive silicone composition.

For example, when the above-mentioned thermally conductive silicone composition is stored at a temperature of 40° C. for 6 months, the difference in specific gravity between the upper portion and the lower portion of the thermally conductive silicone composition is within 0.2.

In the case where the thermally conductive silicone composition of the present invention is stored as a two-component type, it is more preferable that the alkenyl group-containing diorganopolysiloxane having a silanol group is added into a second liquid that does not include the addition catalyst (D) and the condensation catalyst (F).

These diorganopolysiloxanes may be commercially available or prepared by methods known to those skilled in the art.

The content of the organopolysiloxane of the component (A), relative to 100 parts by mass of the total amount of the components (A) and (B) in the thermally conductive silicone composition of the present invention, is preferably 2 parts by mass or more and 90 parts by mass or less, and more preferably 10 parts by mass or more and 80 parts by mass or less. When the content thereof falls within the aforementioned range, the viscosity of the entire thermally conductive composition falls within an appropriate range, and the composition has an appropriate fluidity to improve workability and dischargeability.

Component (B):

The component (B) is a diorganopolysiloxane having two or more hydrogen atoms bonded to a silicon atom.

The component (B) may have a viscosity and a degree of polymerization which are not limited to particular values and which can be selected according to the required mixing viscosity of the thermally conductive composition. For example, the component (B) may have a viscosity, at 25° C., of 10 mPa·s or more and 10,000 mPa·s or less.

The component (B) is a diorganopolysiloxane having two hydrogen atoms bonded to a silicon atom within one molecule, and acts as a cross-linking agent for curing the thermally conductive composition of the present invention.

The bonding position of hydrogen atoms are not particularly limited as long as the number of hydrogen atoms bonded to the silicon atom is two or more, and the number thereof may be two or more and four or less. It is particularly preferable that the component (B) that is linear have a hydrogen atom bonded to a silicon atom at each of both molecular chain terminals, and the number of hydrogen atoms bonded to one silicone atom within one molecule may be two.

Although a hydrogen content of the component (B) is not particularly limited, the hydrogen content of the component (B) is preferably 0.01 mmol/g or more and 2.0 mmol/g or less, more preferably 0.05 mmol/g or more and 1.0 mmol/g or less, and even more preferably 0.4 mmol/g or more and 0.8 mmol/g or more in order to provide practically adequate elongation to the thermally conductive member obtained by curing the thermally conductive silicone composition of the present invention.

The component (B) may be any organohydrogenpolysiloxane as long as it contains two hydrogen atoms (hydrosilyl groups) bonded to a silicon atom within one molecule. Examples thereof that can be used include a methylhydrogenpolysiloxane, a dimethylsiloxane-methylhydrogensiloxane copolymer, a methylphenylsiloxane-methylhydrogensiloxane copolymer, a cyclic methylhydrogenpolysiloxane, and a copolymer composed of a dimethylhydrogensiloxy unit and an $SiO_{4/2}$ unit.

As the component (B), one type thereof may be used alone, or two or more types thereof may be used in combination.

The molecular structure of the component (B) is not particularly limited, and may be, for example, a linear, branched, cyclic, or three-dimensional network structure. Specifically, the structure represented by the following average composition formula (2) can be used:

$$R^3_pH_qSiO_{(4-p-q)/2} \quad (2)$$

(In the formula, $R^3$ is an unsubstituted or substituted monovalent hydrocarbon group excluding an aliphatic unsaturated hydrocarbon group, p is 0 to 3.0, preferably 0.7 to 2.1, q is 0.0001 to 3.0, preferably 0.001 to 1.0, and p+q is a positive number satisfying 0.5 to 3.0, preferably 0.8 to 3.0).

Examples of $R^3$ in the formula (2) include non-substituted or halogen-substituted monovalent hydrocarbon groups and the like normally having 1 to 10 carbon atoms, preferably 1 to 8 carbon atoms excluding an aliphatic unsaturated bond. Specific examples thereof include an alkyl group such as a methyl group, an ethyl group, a propyl group, a butyl group, a pentyl group, a hexyl group, an isopropyl group, an isobutyl group, a tert-butyl group, and a cyclohexyl group; an aryl group such as a phenyl group, a tolyl group, and a xylyl group; an aralkyl group such as a benzyl group and a phenethyl group; and an alkyl halide group such as a 3-chloropropyl group and a 3,3,3-trifluoropropyl group. Among these, a methyl group, an ethyl group, a propyl group, a phenyl group, and a 3,3,3-trifluoropropyl group are preferable, and a methyl group is particularly preferable.

Specific examples of the component (B) include 1,1,3,3-tetramethyldisiloxane, 1,3,5,7-tetramethylcyclotetrasiloxane, a methylhydrogencyclopolysiloxane, a methylhydrogensiloxane-dimethylsiloxane cyclic copolymer, tris (dimethylhydrogensiloxy)methylsilane, tris (dimethylhydrogensiloxy)phenylsilane, a dimethylsiloxane-methylhydrogensiloxane copolymer with both molecular chain terminals blocked with a dimethylhydrogensiloxy group, a methylhydrogenpolysiloxane with both molecular chain terminals blocked with a dimethylhydrogensiloxy group, a methylhydrogenpolysiloxane with both molecular chain terminals blocked with a trimethylsiloxy group, a dimethylpolysiloxane with both molecular chain terminals blocked with a dimethylhydrogensiloxy group, a dimethylsiloxane-diphenylsiloxane copolymer with both molecular chain terminals blocked with a dimethylhydrogensiloxy group, a dimethylsiloxane-methylhydrogensiloxane copolymer with both molecular chain terminals blocked with a trimethylsiloxy group, a dimethylsiloxane-diphenylsiloxane-methylhydrogensiloxane copolymer with both molecular chain terminals blocked with a trimethylsiloxy group, a dimethylsiloxane-methylhydrogensiloxane copolymer with both molecular chain terminals blocked with a dimethylhydrogensiloxy group, a copolymer of a $H(CH_3)_2SiO_{1/2}$ unit and an $SiO_2$ unit, a copolymer of a $H(CH_3)_2SiO_{1/2}$ unit, a $(CH_3)_3SiO_{1/2}$ unit, and an $SiO_2$ unit, and mixtures of two or more of these organohydrogensiloxanes.

In the silicone composition described above, the content of the component (B) is preferably in such a range that the ratio of the number of hydrosilyl groups in the component (B) to that of the alkenyl groups in the component (A) falls within the range of 2/5 to 7, more preferably within the range of 1/2 to 2, and still more preferably within the range of 2/5 to 5/4. When the content thereof falls within the abovementioned range, the thermally conductive silicone composition is sufficiently cured and the hardness of the entire thermally conductive composition becomes a more preferable range, so that cracks are less likely to occur when used as a gap filler. In addition to these, there is an advantage that the thermally conductive silicone composition has both flexibility and adhesive properties and is excellent in tensile shear bond stress and tensile shear bond displacement.

The hydrosilyl group in the component (B) may be at the molecular chain terminals, may be at a side chain, or may be at both the molecular chain terminals and the side chains. A mixture of an organohydrogenpolysiloxane having a hydrosilyl group only at the molecular chain terminals and an organohydrogenpolysiloxane having a hydrosilyl group only at the side chain of the molecular chain may be used.

The component (B) may be a diorganopolysiloxane having hydrogen atoms bonded only to a silicon atom at both terminals of the molecular chain. An organopolysiloxane having a hydrosilyl group at both molecular chain terminals, one at each terminal, has a low hydrosilyl group content, which can increase flexibility of the thermally conductive member obtained after curing and further can enhance adhesion to a substrate, which is advantageous.

The organohydrogenpolysiloxane having a hydrosilyl group only at the molecular chain terminals has an advantage that the organohydrogenpolysiloxane has high reactivity due to low steric hindrance, and the organohydrogenpolysiloxane having a hydrosilyl group at a side chain contributes to network construction by a crosslinking reaction and thus has an advantage of improving the strength thereof.

In order to impart flexibility to the thermally conductive member after curing, an organohydrogenpolysiloxane having a hydrosilyl group only at the molecular chain terminals is preferably used.

From the viewpoint of improving adhesive properties and heat resistance, the component (B) may include an organohydrogenpolysiloxane having a trimethylsiloxy group at both the molecular chain terminals thereof and at least one aromatic group contained within the molecule. For economic reasons, the aromatic group is more preferably a phenyl group. An aromatic group-containing organohydrogenpolysiloxane and an aromatic group-free organohydrogenpolysiloxane may be mixed and used.

The viscosity of the component (B) at 25° C. is 10 mPa·s or more and 10,000 mPa·s or less, preferably 20 mPa·s or more and 5,000 mPa·s or less, and more preferably 30 mPa·s or more and 2,000 mPa·s or less.

In order to adjust the viscosity of the thermally conductive composition, which is a final product, it is also possible to use two or more types of diorganopolysiloxanes having a hydrogen atom and having respective different viscosities. The mixing viscosity of the gap filler composition may be in the range of 10 Pa·s or more and 1,000 Pa·s or less, more preferably in the range of 20 Pa·s or more and 500 Pa·s or less, and even more preferably in the range of 30 Pa·s or more and 250 Pa·s or less.

The content of the organohydrogenpolysiloxane of the component (B), relative to 100 parts by mass of the total amount of the components (A) and (B) in the thermally conductive composition of the present invention, is preferably 10 parts by mass or more and 98 parts by mass or less, and more preferably 20 parts by mass or more and 90 parts by mass or less.

In addition, the content of the component (B) may be in such a range that the ratio of the number of hydrosilyl groups in the component (B) to the number of alkenyl groups in the component (A) is 1/5 to 7.

When the content falls within the aforementioned range, the hardness of the cured thermally conductive composition can fall within an appropriate range, and the thermally conductive member obtained after curing can have excellent tensile shear bond stress and tensile shear bond displacement.

Component (C):

The component (C) is a component to be mixed with the component (F) described below to improve the adhesive properties of the thermally conductive member to a substrate of a battery unit housing, a cooler, or the like or impart tensile strength or elongation to the thermally conductive member.

The component (C) contains at least one selected from an organosilicon compound (C-1) having two or more groups that are at least one selected from a methoxy group and an ethoxy group and not having a hydrocarbon group having 3 or more carbon atoms or a vinyl group, and a hydrolysate (C-2) of the organosilicon compound (C-1).

As the component (C-1), a compound having an epoxy group can also be used. In this case, the compound (C-1) is an organosilicon compound having two or more groups that are at least one selected from an epoxy group, a methoxy group, and an ethoxy group and not having a hydrocarbon group having 3 or more carbon atoms or a vinyl group.

Examples of the component (C-1) include methyltrimethoxysilane, dimethyldimethoxysilane, tetraethoxysilane, methyltriethoxysilane, and dimethyldiethoxysilane.

Examples of the component (C-2) include a hydrolysate of the component (C-1).

The component (C-1) is most preferably tetraethoxysilane, and the component (C-2) is most preferably a hydrolysate of tetraethoxysilane.

The component (C) is not particularly limited, and a publicly known compound can be used as appropriate. For example, from Wacker Chemie AG, methyltrimethoxysilane, dimethyldimethoxysilane, methyltriethoxysilane, dimethyldiethoxysilane, tetraethoxysilane, and an oligomer of tetraethoxysilane are available.

The component (C) may contain the component (C-1) alone or the component (C-2) alone, or may contain both the components (C-1) and (C-2).

As the component (C-1) or (C-2), one type of compound may be used, or a mixture of two or more types of compounds may be used.

The component (C) is subjected to a hydrolysis reaction in the presence of the condensation catalyst (F) to produce a silanol. The produced silanol is reacted with and bonded to a condensable group present on a surface of a substrate of a battery unit housing, a cooler, or the like to impart adhesive properties to the thermally conductive member obtained by curing the thermally conductive silicone composition.

Furthermore, the component (C) is subjected to a dehydration-condensation reaction with a hydroxyl group present on a surface of the thermally conductive filler (E) to cover a part or the whole of the surface of the component (E). This improves the dispersibility of the component (E) and suppresses a phenomenon where the thermally conductive filler (E) is precipitated over time in the thermally conductive silicone composition.

Therefore, a thermally conductive member that has more favorable adhesive properties to a substrate under a vibration condition, has less unevenness of the components in the composition after long time-storage of the thermally conductive silicone composition, and has more stable quality over a long period, compared to a case where the component (C) is not mixed, can be obtained.

When the component (C) is used in a surface treatment of the thermally conductive filler, a method in which the component (C) is dissolved or dispersed in a solvent, and the thermally conductive filler is mixed therewith, heated, and dried is generally adopted. In the present invention, the surface of the thermally conductive filler (E) can be covered with the component (C) by heating and drying, but the surface of the thermally conductive filler (E) can be covered without performing a heating and drying step.

That is, in the present invention, the surface of the thermally conductive filler (E) can be covered with the component (C) by mixing the components (A) to (F) at normal temperature (for example, at 23° C.) without a heating step and a step of dissolving or dispersing the component (C), but the surface of the thermally conductive filler (E) can be covered without performing the heating and drying step. A mixing order is not limited. The components (C) and (E) may be mixed in advance and then introduced into a mixture of the other components, the component (C) may be introduced into a mixture containing the component (E), or the component (E) may be introduced into a mixture containing the component (C).

Thus, the degree of freedom in the order of mixing the components is high, and the heating step is not needed. Therefore, the thermally conductive silicone composition of the present invention can be produced by a simple process.

Here, the substrate may be at least one selected from glass, metal, ceramics, and resin.

The metal substrate to which the thermally conductive silicone composition of the present invention is bonded is preferably a metal substrate selected from aluminum, magnesium, iron, nickel, titanium, stainless steel, copper, lead, zinc, molybdenum, and silicon.

The ceramic substrate to which the thermally conductive silicone composition of the present invention is bonded is preferably aluminum oxide, aluminum nitride, alumina zirconia, zirconium oxide, zinc oxide, barium titanate, lead zirconate titanate, beryllium oxide, silicon nitride, silicon carbide, or the like, as well as oxides, carbides, or nitrides.

The resin substrate to which the thermally conductive silicone composition of the present invention is cured and bonded is preferably a resin substrate selected from polyester, epoxy, polyamide, polyimide, ester, polyacrylamide, acrylonitrile-butadiene-styrene (ABS), styrene, polypropylene, polyacetal, acrylic, polycarbonate (PC), polyethylene terephthalate (PET), polybutylene terephthalate (PBT), polyether ether ketone (PEEK), polymethyl methacrylate (PMMA), and silicone resin substrates.

When the thermally conductive member obtained by curing the thermally conductive silicone composition of the present invention is a gap filler for a battery unit, the battery unit housing that is a substrate to be bonded may have, as a substrate surface, an iron surface where at least is covered by cationic electrodeposition coating and a heat sink may have an aluminum surface.

The thermally conductive silicone composition of the present invention is injected so as to fill a gap between the iron surface, which is covered by cationic electrodeposition coating, and the aluminum surface, and then cured to provide a gap filler. The gap filler is favorably bonded to both the surface of the battery unit housing and the surface of the heat sink even under a condition where the battery unit housing is vibrated.

The amount of the component (C) mixed is within the range of 0.2 parts by mass or more and 5.0 parts by mass or less, more preferably 0.3 parts by mass or more and 3.0 parts by mass or less, and further preferably 0.5 parts by mass or more and 1.0 part by mass or less, relative to 100 parts by mass of the total amount of the components (A) and (B). When the amount of the component (C) falls within the aforementioned range, the thermally conductive silicone composition after curing can be favorably bonded to a substrate even under a vibration condition. The thermally conductive silicone composition has excellent storage stability, and favorable adhesive properties can be maintained under a vibration condition even after a two-component thermally conductive silicone composition is stored in an uncured state (that is, in a state in which a first liquid and a second liquid are not mixed) for 1 week.

Component (D):

The addition catalyst of the component (D) is an addition catalyst that promotes an addition-curing reaction between an alkenyl group bonded to a silicon atom in the component (A) described above and a hydrogen atom bonded to a silicon atom in the component (B) described above, and is a catalyst known to those skilled in the art. Examples of the component (D) include a platinum group metal such as platinum, rhodium, palladium, osmium, iridium, and ruthenium, and catalysts in which any of the aforementioned metals is supported by a particulate carrying material (for example, activated carbon, aluminum oxide, and silicon oxide).

Furthermore, examples of the component (D) include platinum compounds such as a platinum halide, a platinum-olefin complex, a platinum-alcohol complex, a platinum-alcoholate complex, a platinum-vinylsiloxane complex, dicyclopentadiene-platinum dichloride, cyclooctadiene-platinum dichloride, and cyclopentadiene-platinum dichloride.

In addition, from an economic viewpoint, a metal compound catalyst other than platinum group metals as described above may be used as the component (D). Examples of the iron catalyst for hydrosilylation include an iron-carbonyl complex catalyst, an iron catalyst having a cyclopentadienyl group as a ligand, an iron catalyst having a terpyridine-based ligand or having a terpyridine-based ligand and a bistrimethylsilylmethyl group, an iron catalyst having a bisiminopyridine ligand, an iron catalyst having a bisiminoquinoline ligand, an iron catalyst having an aryl group as a ligand, an iron catalyst having a cyclic or acyclic olefin group with an unsaturated group, and an iron catalyst having a cyclic or acyclic olefinyl group with an unsaturated group. Other examples of the catalyst for hydrosilylation include a cobalt catalyst, a vanadium catalyst, a ruthenium catalyst, an iridium catalyst, a samarium catalyst, a nickel catalyst, and a manganese catalyst.

The amount of the component (D) added is, in terms of the concentration of the catalyst metal element, in the range of preferably 0.5 ppm or more and 1,000 ppm or less, more preferably 1 ppm or more and 500 ppm or less, and still more preferably 1 ppm or more and 100 ppm or less relative to the total mass of the thermally conductive silicone composition, although an effective amount thereof according to the curing temperature and curing time desired depending on the use applications is used. If the amount is less than 0.5 ppm, the addition reaction becomes remarkably slow. If the amount exceeds 1,000 ppm, it is not economically preferable because of cost increase.

Component (E):

The thermally conductive filler of the component (E) is a filling material component that improves the thermal conductivity of the thermally conductive composition. The thermally conductive filler used in the present invention is not particularly limited so long as it is a filler having thermal conductivity, and for example, can be at least one or two or more types selected from a metal, a metal oxide, a metal hydroxide, a metal nitride, and a metal carbide.

In order to obtain a gap filler having high insulation properties for application to an electronic substrate or the like, it is preferable to use a material having excellent insulation properties as well as thermal conductivity as the thermally conductive filler (E).

Examples of the thermally conductive filler (E) include a metal oxide such as aluminum oxide, zinc oxide, magnesium oxide, titanium oxide, silicon oxide, and beryllium oxide; a metal hydroxide such as aluminum hydroxide and magnesium hydroxide; a nitride such as aluminum nitride, silicon nitride, and boron nitride; a carbide such as boron carbide, titanium carbide, and silicon carbide; graphite such as graphite and black lead, a metal such as aluminum, copper, nickel, and silver, and mixtures thereof. In particular, when electrical insulation is required for the silicone composition, the thermally conductive filler (E) is preferably a metal oxide, a metal hydroxide, a nitride, or a mixture thereof, and it may be an amphoteric hydroxide or an amphoteric oxide. Specifically, it is preferable to use one or two or more types selected from the group consisting of aluminum hydroxide, boron nitride, aluminum nitride, zinc oxide, aluminum oxide, magnesium oxide, and magnesium hydroxide.

It should be noted that since aluminum oxide, aluminum hydroxide, magnesium oxide, magnesium hydroxide, zinc oxide, aluminum nitride, and boron nitride are insulating materials, have relatively good compatibility with the components (A) and (B), can be industrially selected from a wide variety of particle diameters, are readily available resources, and are relatively inexpensive, they are suitable as the thermally conductive inorganic filling material.

In the thermally conductive silicone composition of the present invention, it is more preferable to use at least one selected from aluminum oxide, aluminum hydroxide, magnesium oxide, magnesium hydroxide, zinc oxide, aluminum nitride, and boron nitride as the component (E) in order to obtain adhesive properties and elongation under a vibration condition. When only one component is used as the component (E), aluminum oxide, aluminum hydroxide, or zinc oxide is preferably selected, and aluminum oxide is more preferably selected. Even when only one type is used, it is more preferable to combine two or more types of different shapes. Examples thereof include a combination of spherical aluminum oxide and amorphous aluminum oxide and a combination of spherical zinc oxide and amorphous zinc oxide.

As the component (E), it is more preferable to use at least two types selected from aluminum oxide, aluminum hydroxide, magnesium oxide, magnesium hydroxide, zinc oxide, aluminum nitride, and boron nitride. Examples include a combination of spherical aluminum oxide, amorphous aluminum oxide, and amorphous zinc oxide.

The shape of the thermally conductive filler is not particularly limited. For example, the shape of the thermally conductive filler may be a spherical shape, an amorphous shape, a fine powder, a fibrous shape, a scale shape, or the like. In order to add the thermally conductive filler in an amount required to increase the thermal conductivity of the thermally conductive member, the shape of the thermally conductive filler is preferably a spherical shape, and the average particle diameter may be 1 to 100 μm. Herein, the spherical shape may be not only a true spherical shape but also a rounded shape.

When spherical aluminum oxide is used as the component (E), α-alumina obtained by high-temperature thermal spraying or hydrothermal treatment of alumina hydrate may be used.

In order to improve the filling rate of the thermally conductive filler, it is more preferable to use a spherical thermally conductive filler and a thermally conductive filler other than a spherical filler. When at least two or more types of thermally conductive fillers having different shapes are used in combination, the fillers can be filled in a state that is almost the closest packed, whereby the effect of increasing the thermal conductivity can be obtained. When a spherical thermally conductive filler and a thermally conductive filler other than the spherical shape (for example, an amorphous thermally conductive filler) are used in combination, it is possible to further enhance the thermal conductivity.

The thermally conductive filler preferably has a thermal conductivity of 10 W/m·K or more. If the thermal conductivity is less than 10 W/m·K, the thermal conductivity itself of the thermally conductive silicone composition may be reduced. In particular, if the thermally conductive member requires electrical insulation, it is conceivable to select a non-conductive thermally conductive filler.

The thermally conductive filler may be added in an amount required to increase the thermal conductivity of the thermally conductive member (for example, 2.0 W/m·K or more). For example, the content of the component (E) may be 500 parts by mass or more and 2,000 parts by mass or less relative to 100 parts by mass of the total amount of the component (A) and the component (B). The content of the component (E) is preferably 300 parts by mass or more and 2,000 parts by mass or less, more preferably 400 parts by mass or more and 1,900 parts by mass or less, and even more preferably 500 parts by mass or more and 1,800 parts by mass or less.

When the content falls within the above-mentioned range, the thermally conductive composition as a whole has sufficient thermal conductivity, is easy to be mixed at the time of blending, maintains flexibility even after curing, and does not excessively increase the specific gravity thereof. Thus, the resulting composition is more suitable as a thermally conductive composition for forming a thermally conductive member that is required to have thermal conductivity and weight reduction. If the content of the component (E) is too small, it becomes difficult to sufficiently increase the thermal conductivity of the cured product of the obtained thermally conductive composition. If the content of the component (E) is too large, the silicone composition will become highly viscous, and there may be a possibility that it becomes difficult to uniformly apply the thermally conductive composition, resulting in problems such as an increase in the thermal resistance value of the cured composition and a decrease in flexibility.

The average particle diameter of the component (E) is not particularly limited, and may be in the range of 1 μm or more and 100 μm or less. If the average particle diameter is too small, the fluidity of the silicone composition will be lowered. If the average particle diameter is too large, there is a possibility that problems could occur such as the scraping of the coating apparatus due to the filler being caught by the sliding portion of the apparatus. In the present invention, the average particle diameter of the component (C) is defined by D50 (or median diameter) that is the 50% particle diameter in the volume-based cumulative particle size distribution measured by a laser diffraction particle size measuring device.

Component (F):

The thermally conductive silicone composition of the present invention contains a condensation catalyst as the component (F). The condensation catalyst (F) is a component that contributes to adhesive properties of the cured product of the thermally conductive silicone composition of the present invention to a metal and an organic resin under a vibration condition even without high-temperature curing and/or performing a high-temperature treatment, that is, at normal temperature. There are usually a condensable group, such as a hydroxyl group, an alkoxy group, an alcohol group, a ketone group, an ester group, an acrylic group, an ether group, a phenol group, and an acid group, on a surface of a metal substrate such as aluminum and a surface of an organic resin substrate such as PET. The component (F) promotes condensation of the condensable group with a group or an atom present in the thermally conductive filler-containing thermally conductive silicone composition of the present invention, such as an alkoxy group, a hydroxyl group, and a hydrogen atom bonded to a silicon atom.

As the condensation catalyst of the component (F), a compound of a metal selected from magnesium, aluminum, titanium, chromium, iron, cobalt, nickel, copper, zinc, zirconium, tungsten, and bismuth can be used. Metal compounds such as organic acid salts, alkoxides, and chelate compounds of trivalent aluminum, trivalent iron, trivalent cobalt, divalent zinc, tetravalent zirconium, and trivalent bismuth are preferably mentioned.

Specific examples thereof include an organic acid such as octylic acid, lauric acid, and stearic acid, an alkoxide such as a propoxide and a butoxide, and a multidentate ligand chelating compound such as catechol, crown ether, a polyvalent carboxylic acid, hydroxy acid, diketone such as ethyl acetoacetate, and keto acid. Here, a plurality of types of ligands may be bonded to one metal. In particular, a metal chelate compound containing an alkoxy group is preferable.

In particular, compounds of titanium, zirconium and aluminum, which are easy to obtain stable curability even if the added amount and use conditions are somewhat different.

Examples of the condensation catalyst (F) that is an alkoxy group-containing titanium compound include titanium tetramethoxide, titanium tetraethoxide, titanium tetraallyloxide, titanium tetra-n-propoxide, titanium tetraisopropoxide, titanium tetra-n-butoxide, titanium tetraisobutoxide, titanium tetra-s-butoxide, titanium tetra-t-butoxide, titanium tetra-n-pentyloxide, titanium tetracyclopentyloxide, titanium tetrahexyloxide, titanium tetracyclohexyloxide, titanium tetrabenzyloxide, titanium tetraoctyloxide, titanium tetrakis(2-ethylhexyloxide), titanium tetradecyloxide, titanium tetradodecyloxide, titanium tetrastearyloxide, titanium tetrabutoxide dimer, titanium tetrakis(8-hydroxyoctyloxide), titanium diisopropoxidebis(2-ethyl-1,3-hexanediolate), titanium bis(2-ethylhexyloxy)bis(2-ethyl-1,3-hexanediolate), titanium tetrakis(2-methoxyethoxide), titanium tetrakis(2-ethoxyethoxide), titanium butoxide trimethoxide, titanium dibutoxide dimethoxide, titanium butoxide triethoxide, titanium dibutoxide diethoxide, titanium butoxide triisopropoxide, titanium dibutoxide diisopropoxide, and titanium tetraphenoxide.

Examples of the condensation catalyst (F) that is a titanium chelate compound include titanium dimethoxybis(ethyl acetoacetate), titanium dimethoxide bis(acetyl acetonate), titanium diethoxybis(ethyl acetoacetate), titanium diethoxide bis(acetyl acetonate), titanium diisopropoxybis(ethyl acetoacetate), titanium diisopropoxybis(methyl acetoacetate), titanium diisopropoxybis(t-butyl acetoacetate), titanium diisopropoxybis(methyl-3-oxo-4,4-dimethylhexanoate), titanium diisopropoxybis(acetyl acetonate), titanium di-n-butoxybis(ethyl acetoacetate), titanium di-n-butoxybis(acetyl acetonate), titanium diisobutoxybis(acetyl acetonate), titanium di-t-butoxybis(ethyl acetoacetate), titanium di-t-butoxybis(acetyl acetonate), titanium tetrakis(ethyl acetoacetate), titanium tetrakis(acetyl acetonate), titanium bis(trimethylsiloxy)bis(ethyl acetoacetate), and titanium bis(trimethylsiloxy)bis(acetyl acetonate).

Examples of the condensation catalyst (F) that is an alkoxy group-containing zirconium compound include zirconium tetramethoxide, zirconium tetraethoxide, zirconium tetraallyl oxide, zirconium tetra-n-propoxide, zirconium tetraisopropoxide, zirconium tetra-n-butoxide, zirconium tetraisobutoxide, zirconium tetra-s-butoxide, zirconium tetra-t-butoxide, zirconium tetra-n-pentyloxide, zirconium tetracyclopentyloxide, zirconium tetrahexyloxide, zirconium tetracyclohexyloxide, zirconium tetrabenzyloxide, zirconium tetraoctyloxide, zirconium tetrakis(2-ethylhexyloxide), zirconium tetradecyloxide, titanium tetradodecyloxide, zirconium tetrastearyloxide, zirconium tetrakis(2-methoxyethoxide), zirconium tetrakis(2-ethoxyethoxide), zirconium butoxide trimethoxide, zirconium dibutoxide dimethoxide, zirconium butoxide triethoxide, zirconium dibutoxide diethoxide, zirconium butoxide triisopropoxide, zirconium dibutoxide diisopropoxide, and zirconium tetraphenoxide.

Examples of the condensation catalyst (F) that is a zirconium chelate compound include zirconium tetra(acetyl acetonate), zirconium dimethoxybis(ethyl acetoacetate), zirconium dimethoxidebis(acetyl acetonate), zirconium diethoxybis(ethyl acetoacetate), zirconium diethoxidebis(acetyl acetonate), zirconium diethoxidebis(ethyl acetoacetate), zirconium diisopropoxybis(ethyl acetoacetate), zirconium triisopropoxy(ethyl acetoacetate), zirconium tri-n-butoxide(ethyl acetoacetate), zirconium diisopropoxybis(methyl acetoacetate), zirconium diisopropoxybis(t-butyl acetoacetate), zirconium diisopropoxybis(acetyl acetonate), zirconium di-n-butoxybis(ethyl acetoacetate), zirconium di-n-butoxybis(acetyl acetonate), zirconium diisobutoxybis(ethyl acetoacetate), zirconium diisobutoxybis(acetyl acetonate), zirconium di-t-butoxybis(ethyl acetoacetate), zirconium di-t-butoxybis(acetyl acetonate), zirconium isopropoxytris(ethyl acetoacetate), zirconium-n-butoxidetris(ethyl acetoacetate), zirconium tetrakis(ethyl acetoacetate), and zirconium tetrakis(acetyl acetonate).

Examples of the condensation catalyst (F) that is an acylate compound containing zirconium include zirconium octylate and zirconium stearate.

Examples of the condensation catalyst (F) that is an alkoxy group-containing aluminum compound include aluminum trimethoxide, aluminum triethoxide, aluminum triallyl oxide, aluminum tri-n-propoxide, aluminum triisopropoxide, aluminum tri-n-butoxide, aluminum triisobutoxide, aluminum tri-s-butoxide, aluminum tri-t-butoxide, aluminum tri-n-pentyloxide, aluminum tricyclopentyloxide, aluminum tridecyloxide, aluminum tridodecyloxide, aluminum tristearyloxide, aluminum tris(2-methoxyethoxide), aluminum tris(2-ethoxyethoxide), aluminum butoxide dimethoxide, aluminum methoxide dibutoxide, aluminum butoxide diethoxide, aluminum ethoxide dibutoxide, aluminum butoxide diisopropoxide, aluminum isopropoxide dibutoxide, and aluminum triphenoxide.

Examples of the condensation catalyst (F) that is an aluminum chelate compound include aluminum methoxybis(ethyl acetoacetate), aluminum methoxidebis(acetyl acetonate), aluminum ethoxybis(ethyl acetoacetate), aluminum ethoxidebis(acetyl acetonate), aluminum isopropoxybis(ethyl acetoacetate), aluminum isopropoxybis(methyl acetoacetate), aluminum isopropoxybis(t-butyl acetoacetate), aluminum dimethoxide(ethyl acetoacetate), aluminum dimethoxy(acetyl acetonate), aluminum diethoxy(ethyl acetoacetate), aluminum diethoxy(acetyl acetonate), aluminum diisopropoxy(ethyl acetoacetate), aluminum diisopropoxy(methyl acetate), aluminum diisopropoxy(t-butyl acetoacetate), aluminum diisopropoxy(methyl acetoacetate), aluminum isopropoxybis(acetyl acetonate), aluminum-n-butoxybis(ethyl acetoacetate), aluminum-n-butoxybis(acetyl acetonate), aluminum isobutoxybis(ethyl acetoacetate), aluminum isobutoxybis(acetyl acetonate), aluminum-t-butoxybis(ethyl acetoacetate), aluminum-t-butoxybis(acetyl acetonate), aluminum-2-ethylhexoxybis(ethyl acetoacetate), aluminum tris(ethyl acetoacetate), aluminum tris(acetyl acetonate), and aluminum(acetyl acetonate)bis(ethyl acetoacetate).

Since the adhesive properties of the cured product of the thermally conductive silicone composition to a substrate under a vibration condition can be maintained even after storage for 6 months, use of titanium diisopropoxy bis (ethylacetoacetate) as the component (F) is the most preferred.

The content of the condensation catalyst as the component (F) may be a catalytic amount, and can be appropriately set according to the chemical composition, the curing condition, and the like of the thermally conductive silicone composition. For example, the content of the component (F) may be 0.1 to 20% by mass in terms of metal relative to the mass of the component (A).

Since the thermally conductive silicone composition has favorable storage stability, can maintain, after curing, favorable adhesive properties to a substrate such as a heat generating body or a heat dissipating body under a vibration condition, and has high thermal conductivity, a thermally conductive member having excellent heat dissipation properties can be provided.

Specifically, the thermal conductivity of the thermally conductive member obtained after curing is 2.0 W/m·K or more, and the thermally conductive member exhibits a high tensile shear bond stress of 0.10 MPa or more in a measurement test of tensile shear bond stress described below and has a high tensile shear bond displacement in which the displacement at the maximum stress is 0.30 mm or more in a measurement test of tensile shear bond displacement. When the tensile shear bond stress and the tensile shear bond displacement of the thermally conductive member are within the aforementioned ranges, the thermally conductive member exhibits favorable adhesive properties to a substrate under a vibration condition.

Since the thermal conductivity, the tensile shear bond stress, and the tensile shear bond displacement can be maintained within the aforementioned ranges after a two-component thermally conductive silicone composition is stored in an uncured state (that is, in a state in which a first liquid and a second liquid are not mixed) for 24 hours and 7 days, the thermally conductive silicone composition of the present invention has excellent storage stability.

<Measurement Test of Tensile Shear Bond Displacement and Measurement Test of Tensile Shear Bond Stress>

The thermally conductive silicone composition is placed between an aluminum specimen and an iron specimen subjected to cationic electrodeposition coating such that the coating area is 25 mm in length and 25 mm in width and the thickness is 0.6 mm, and cured at 23° C. for 24 hours, to obtain a specimen for a tensile shear bond test.

The specimen for a tensile shear bond test is subjected to a tensile shear bond test by a method in accordance with JIS K6850, to obtain a graph of S-S curve.

In the graph of S-S curve, the stroke amount at a point where the stress becomes maximum is taken as a tensile shear bond displacement of the cured product of the silicone composition corresponding to the specimen for a tensile shear bond test.

In the graph of S-S curve, the maximum value of stress is taken as a tensile shear bond stress of the cured product of the silicone composition corresponding to the specimen for a tensile shear bond test.

Component (G):

The thermally conductive silicone composition of the present invention may further optionally contain a cyclic hydrogenated siloxane having a degree of polymerization of 4 or more and 10 or less. The component (G) may be one type of cyclic hydrogenated siloxane or may be one containing a plurality of types of cyclic hydrogenated siloxanes as long as the degree of polymerization is within the range of 4 or more and 10 or less. The degree of polymerization of the component (G) may be selected according to stability required for the thermally conductive silicone composition, and tensile strength, "SE ch KAKU RYOKU", heat resistance, and moisture resistance required for the thermally conductive member.

It is preferable that as the component (G), (G-1) 1,3,5,7,9-pentamethylcyclopentasiloxane or (G-2) 1,3,5,7,9,11-hexamethylcyclohexasiloxane be contained. By mixing the component (G-1) or (G-2), the crosslinking density can be increased, and the tensile strength and the adhesive force of the cured product obtained can be improved. By mixing both the components (G-1) and (G-2), the heat resistance and the moisture resistance of the thermally conductive member obtained by curing the thermally conductive silicone composition can be improved.

The amount of the component (G) added can be determined according to properties such as the strength and adhesive force required for the thermally conductive member. The amount of the component (G) added is 0.01 parts by mass or more and 2.0 parts by mass or less relative to 100 parts by mass of the total amount of the components (A) and (B).

When the component (G-1) and/or the component (G-2) are contained as the component (G), the amount of the component (G-1) and the amount of the component (G-2) may be each 0.01 parts by mass or more and 1.0 part by mass or less, preferably 0.05 parts by mass or more and 0.7 parts by mass or less, and more preferably 0.1 parts by mass or more and 0.5 parts by mass or less.

The total amount of the components (G-1) and (G-2) contained in the component (G) is preferably 30% by weight or more and 99% by weight or less relative to 100% by mass of the whole component (G). When the component (G) contains the components (G-1) and (G-2), the proportions of the components (G-1) and (G-2) are not particularly limited. For example, the amount of the component (G-2) may be 50% or more and 150% or less or 70% or more and 110% or less, of the weight of the component (G-1).

Component (H):

In the thermally conductive silicone composition according to the present invention, a filler other than the component (E) can be further mixed. Examples of the filler other than the component (E) include fillers having non-thermal conductivity such as hydrophilic silica, hydrophobic silica, crystalline silica, precipitated silica, a hollow filler, silsesquioxane, magnesium carbonate, calcium carbonate, zinc carbonate, lamellar mica, carbon black, diatomaceous earth, glass fibers, a silicone rubber powder, and a silicone resin powder.

It is particularly preferable that hydrophobic silica (H) be mixed since a thermally conductive silicone composition that enhances tensile strength and has excellent precipitation suppression in which precipitation over time of the filler is suppressed during storage can be obtained. The amount of the hydrophobic silica (H) added is preferably 0.05 parts by mass or more and 10.0 parts by mass or less, and more preferably 0.1 parts by mass or more and 1.0 part by mass or less, relative to 100 parts by mass of the total amount of the components (A) and (B). When the amount thereof is less than 0.05 parts by mass, precipitation suppression is low. When the amount thereof is more than 10 parts by mass, hygroscopicity is increased, and flowability is reduced.

In the thermally conductive silicone composition of the present invention, as an additional optional component other than the aforementioned components (A) to (H), a conventionally known additive for use in a silicone rubber or gel can be used as long as the object of the present invention is not impaired. Examples of such additives include an organosilicon compound or an organosiloxane other than the component (C) (also referred to as a silane coupling agent) that produces silanols by hydrolysis, a cross-linking agent, an adhesive aid, a pigment, a dye, a curing inhibitor, a heat-resistance imparting agent, a flame retardant, an antistatic agent, a conductivity imparting agent, an airtightness improving agent, a radiation shielding agent, an electromagnetic wave shielding agent, a preservative, a stabilizer, an organic solvent, a plasticizer, a fungicide, an organopolysiloxane which contains one hydrogen atom or alkenyl group bonded to a silicon atom within one molecule and which contains no other functional groups, and a non-functional organopolysiloxane containing neither a hydrogen atom nor an alkenyl group bonded to a silicon atom. As these optional components, one type thereof may be used alone, or two or more types thereof may be used in combination.

Examples of the silane coupling agent include an organosilicon compound and an organosiloxane having an organic group having three or more carbon atoms and a silicon atom-bonded alkoxy group within one molecule, the organic group including an epoxy group, an alkyl group, an aryl group, a vinyl group, a styryl group, a methacryl group, an acryl group, an amino group, an isocyanurate group, a ureide group, a mercapto group, an isocyanate group, and an acid anhydride. An example of the silane coupling agent is a silane compound such as octyltrimethoxysilane, octyltriethoxysilane, decyltrimethoxysilane, decyltriethoxysilane, dodecyltrimethoxysilane, dodecyltriethoxysilane, vinyltrimethoxysilane, 3-glycidoxypropyltrimethoxysilane, p-styryltrimethoxysilane, 3-methacryloxypropyltrimethoxysilane, 3-acryloxypropyltrimethoxysilane, 3-aminopropyltrimethoxysilane, 3-aminopropyltriethoxysilane, tris-(trimethoxysilylpropyl)isocyanurate, 3-ureidopropyltrialkoxysilane, 3-mercaptopropylmethyldimethoxysilane, 3-isocyanatopropyltriethoxysilane, and 3-trimethoxysilylpropyl succinic anhydride. The silane compound may be a compound having no hydrosilyl group. One type thereof may be used alone, or two or more types thereof may be used in combination. When the surface of the thermally conductive filler is treated with the silane coupling agent, the affinity with the silicone polymer can be improved, the viscosity of the composition can be decreased, and the filling properties of the thermally conductive filler can be improved. Therefore, when a larger amount of the thermally conductive filler is added, thermal conductivity can be improved.

As the amount of the silane coupling agent added relative to that of the thermally conductive filler, an effective amount according to curing temperature or curing time desired depending on the use applications is used. A general optimum amount is usually 0.5 wt % or more and 2 wt % or less relative to the amount of the thermally conductive filler. A standard of a required amount is calculated by the following expression. The silane-coupling agent may be added in an amount one to three times the standard of the required amount.

Required amount (g) of silane coupling agent=Mass (g) of thermally conductive filler×Specific surface area ($m^2/g$) of thermally conductive filler/Minimal covering area specific to silane coupling agent ($m^2/g$)

An organohydrogenpolysiloxane can be used as a cross-linking agent. The cross-linking agent component can undergo an addition reaction with an alkenyl group to form a cured product, and can have a hydrogen atom bonded to at least one or more silicon atoms at a side chain of the molecule (hydrosilyl group). The cross-linking agent preferably has three or more hydrosilyl groups within one molecule and has at least one hydrosilyl group at a side chain in the molecule.

The cross-linking agent in the present invention is more preferably an organohydrogenpolysiloxane having 5 or more hydrosilyl groups, and may have 10 or more and 15 or less hydrosilyl groups. The organohydrogenpolysiloxane that is the cross-linking agent has at least two hydrosilyl groups at a side chain. The number of hydrosilyl groups at a molecular chain terminal may be zero or more and two or less, but is preferably two in terms of cost. The molecular structure of the organohydrogenpolysiloxane may be any of linear, cyclic, branched, and three-dimensional network structures. The position of the silicon atom to which a hydrogen atom is bonded is not particularly limited. Such a silicon atom may be at a molecular chain terminal, at a non-terminal molecular chain site, or at a side chain. Other conditions, the organic group other than the hydrosilyl group, the bonding position thereof, the degree of polymerization, structure, and the like are not particularly limited. Two or more types of organohydrogenpolysiloxanes may be used.

The cross-linking agent may be added in an amount necessary to form a matrix including the component (A) and the component (B) by crosslinking. The amount of the cross-linking agent component added may be 1 part by mass or more and 10 parts by mass or less, more preferably 1 part by mass or more and 6 parts by mass or less, and even more preferably 1 part by mass or more and 4 parts by mass or less, relative to 100 parts by mass of the total amount of the component (A) and the component (B), for example.

As the adhesive aid, preferably mentioned are 3-glycidoxypropyltrimethoxysilane, 3-glycidoxypropyltriethoxysilane, an oligomer of 3-glycidoxypropyltrimethoxysilane, an oligomer of 3-glycidoxypropyltriethoxysilane, and those having, as an organic functional group, one or more groups selected from a vinyl group, a methacryl group, an acryl group, and an isocyanate group. Further examples thereof include a methacryloxysilane such as 3-methacryloxypropyltrimethoxysilane and 3-methacryloxypropyltriethoxysilane, 3-trimethoxysilylpropylsuccinic anhydride, and a furandione such as dihydro-3-(3-(triethoxysilyl)propyl)-2,5-furandione.

The organic functional group may be bonded to a silicon atom via another group such as an alkylene group. In addition to the above, those containing an organosilicon compound or an organosiloxane having an organic group such as an epoxy group, an alkyl group, or an aryl group and a silicon atom-bonded alkoxy group within one molecule are preferred. Furthermore, an organosilicon compound or an organosiloxane having at least one organic group such as an epoxy group, an alkyl group, or an aryl group and at least two silicon atom-bonded alkoxy groups within one molecule are preferred. Such epoxy groups can be bonded to a silicone atom in the form of a glycidoxyalkyl group such as a glycidoxypropyl group, or an epoxy-containing cyclohexylalkyl group such as a 2,3-epoxycyclohexylethyl group or a 3,4-epoxycyclohexylethyl group. Alternatively, an organic group having a linear or branched alkyl group having 1 to 20 carbon atoms or an aromatic ring is preferred. If the epoxy group is contained, two to three epoxy groups may be contained within one molecule. Preferred examples of the silicon atom-bonded alkoxy group include a methoxy group, an ethoxy group, and a propoxy group. Further examples include an alkyldialkoxysilyl group such as a methyldimethoxysilyl group, an ethyldimethoxysilyl group, a methyldiethoxysilyl group, and an ethyldiethoxysilyl group.

As functional groups other than those described above, for example, a functional group selected from an alkenyl group such as a vinyl group, a (meth)acryloxy group, a hydrosilyl group (a hydrosilyl group), and an isocyanate group may be used.

Examples of the pigment include titanium oxide, alumina silicic acid, iron oxide, zinc oxide, calcium carbonate, carbon black, a rare earth oxide, chromium oxide, a cobalt pigment, ultramarine blue, cerium silanolate, aluminum oxide, aluminum hydroxide, titanium yellow, carbon black, barium sulfate, precipitated barium sulfate, and mixtures thereof.

The amount of the pigment added is preferably in the range of 0.001% to 5% relative to the total mass of the thermally conductive silicone composition although an effective amount thereof according to the curing temperature and curing time desired depending on the use applications is used. The amount of the pigment is preferably in the range of 0.01% or more and 2% or less, and more preferably 0.05% or more and 1% or less. If the added amount is less than 0.001%, the resulting composition is insufficiently colored, so it is difficult to visually distinguish the first liquid from the second liquid. On the other hand, if the added amount exceeds 5%, the cost will increase, which is not economically preferable.

The curing inhibitor has an ability of adjusting the curing rate of the addition reaction, and any curing inhibitor conventionally known in the art can be used as the compound having a curing suppressing effect. Examples thereof include an acetylene-based compound, hydrazines, triazoles, phosphines, and mercaptans. Specific examples of such compounds include a phosphorus-containing compound such as triphenylphosphine, a nitrogen-containing compound such as tributylamine, tetramethylethylenediamine, and benzotriazole, a sulfur-containing compound, an acetylene-based compound, a compound containing two or more alkenyl groups, a hydroperoxy compound, and a maleic acid derivative. Silane and a silicone compound having an amino group may be used.

The amount of the curing inhibitor added is preferably in the range of 0.1 parts by mass to 15 parts by mass relative to 100 parts by mass of the total amount of the components (A) and (B), although an effective amount thereof depending on the curing temperature and curing time desired depending on the use applications is used. The added amount is preferably in the range of 0.2 parts by mass to 10 parts by mass, and more preferably in the range of 0.5 parts by mass to 5 parts by mass. If the amount is less than 0.1 parts by mass, the addition reaction becomes remarkably accelerated, and the curing reaction proceeds during coating, which may deteriorate the workability. On the other hand, if the amount exceeds 10 parts by mass, the addition reaction becomes slow, so a pump-out phenomenon may occur.

Specific examples thereof include various "ene-yne" systems such as 3-methyl-3-pentene-1-yne and 3,5-dimethyl-3-hexene-1-yne; an acetylenic alcohol such as 3,5-dimethyl-1-hexin-3-ol, 1-ethynyl-1-cyclohexanol, and 2-phenyl-3-butyn-2-ol; well-known maleates and fumarates such as a dialkyl maleate, a dialkenyl maleate, a dialkoxyalkyl maleate, a dialkyl fumarate, a dialkenyl fumarate, and a dialkoxyalkyl fumarate; and those containing cyclovinylsiloxane.

Examples of the heat-resistance imparting agent include cerium hydroxide, cerium oxide, iron oxide, fumed titanium dioxide, and mixtures thereof.

As the airtightness improving agent, any agent may be used as long as it has an effect of reducing the air permeability of the cured product, and any organic or inorganic substance may be used. Specific examples thereof include a urethane, a polyvinyl alcohol, a polyisobutylene, an isobutylene-isoprene copolymer, talc having a plate-like shape, mica, glass flakes, boehmite, powders of various metal foils and metal oxides, and mixtures thereof.

The thermally conductive silicone composition of the present invention may contain any one or two or more types of octamethylcyclotetrasiloxane (D4), decamethylcyclopentasiloxane (D5), or dodecamethylcyclohexasiloxane (D6), tetradecamethylcycloheptasiloxane (D7), hexadecamethylcyclooctasiloxane (D8).

The total content of each of (D4), (D5), (D6), (D7), and (D8) may be less than 0.1 parts by mass (i.e., less than 1,000 ppm) relative to 100 parts by mass of the total amount of the components (A) and (B).

When the total content of (D4) to (D8) contained in the thermally conductive silicone composition falls within the aforementioned range, the flashing point of the whole composition may be increased, and safety during storage may be improved. Furthermore, the thermally conductive member obtained by curing the composition can be provided in a manner wherein the member is unlikely to cause a contact failure with an electronic part and the like.

A thermally conductive silicone composition containing (D4) to (D8) in an amount of less than 0.1 parts by mass as the total content of (D4) to (D8) relative to 100 parts by mass of the total amount of the components (A) and (B) can be produced by using the component (A) in which the total content of (D4) to (D8) is less than 0.1 parts by mass, the component (B) in which the total content of (D4) to (D8) is less than 0.1 parts by mass, and the component (C) in which the total content of (D4) to (D8) is less than 0.1 parts by mass.

The respective contents of (D4) to (D8) are measured by gas chromatography. A measurement condition of gas chromatography may be appropriately selected in accordance with a conventionally known method.

Use of the components (A), (B), and (C) in which the contents of (D4), (D5), (D6), (D7), and (D8) are small can make the content of each of (D4) to (D8) fall within the aforementioned range. As a method for reducing the contents of (D4) to (D8) in the components (A) to (C), a method of subjecting a component to a heating treatment under reduced pressure is widely known. For example, it is preferable that a heating treatment under reduced pressure be performed at 180° C. and 20 mmHg for about 8 hours during production of raw materials for the components (A) to (C).

The thermally conductive silicone composition according to the present invention is an addition-curable composition and may be a one-component composition or a two-component composition. When the composition is a one-component type, a storage property can be improved when the composition is appropriately designed to be cured by heat.

In the case of a two-component composition, it becomes possible to further improve storage stability without these contrivances, and it is easy to obtain a composition that cures at room temperature (e.g., 25° C.). In that case, the thermally conductive composition according to the present invention can be dispensed into the first liquid and the second liquid, for example as follows. The first liquid does not contain the component (B) and contains the components (D) and (F), and the second liquid contains the components (B) and (C) and does not contain the components (D) and (F).

The component (E) may be contained only in the first liquid or the second liquid, but is preferably contained in both.

When the component (G) is contained as an optional component, these components are preferably contained in the second liquid.

When an alkenyl group-containing diorganopolysiloxane having at least one silanol group at the molecular chain terminals is contained as the component (A), the component is preferably contained in the second liquid. This is because the second liquid does not contain a condensation catalyst, and a phenomenon can be prevented, the phenomenon in which the alkenyl group-containing diorganopolysiloxane having a silanol group reacts with the component (C) in the presence of the catalyst during storage to change the physical properties over time.

Therefore, the method for producing the two-component thermally conductive silicone composition of the present invention includes:

- a first step of mixing (A) a diorganopolysiloxane having an alkenyl group bonded to a silicon atom, (D) an addition catalyst, (E) a thermally conductive filler, and (F) a condensation catalyst to obtain a first liquid; and
- a second step of mixing (A) the diorganopolysiloxane having an alkenyl group bonded to a silicon atom, (B) a diorganopolysiloxane having a hydrogen atom bonded to a silicon atom, (C) at least one selected from (C-1) an organosilicon compound having two or more groups that are at least one selected from a methoxy group and an ethoxy group and not having a hydrocarbon group having 3 or more carbon atoms or a vinyl group, and (C-2) a hydrolysate of the organosilicon compound (C-1);

and (E) a thermally conductive filler to obtain a second liquid.

The present invention is also a method for producing a gap filler, comprising: a mixing step of mixing a first liquid and a second liquid of the two-component thermally conductive composition described above; an application step of applying a thermally conductive silicone composition, which is a mixture of the first liquid and the second liquid obtained in the mixing step, to at least one of a battery unit housing and the cooler; and a curing step of curing the uncured thermally conductive silicone composition applied in the application step at a temperature of 15° C. or higher and 40° C. or lower.

From the thermally conductive composition applied to a substrate in the application step, a thermally conductive member that is a non-flowable cured product is formed within about 120 minutes after the application.

The temperature during curing the composition after applying to a substrate is not particularly limited, and may be, for example, 15° C. or higher and 60° C. or lower. In order to reduce thermal damage against the substrate such as a battery unit housing, a cooler, or the like, the temperature may be 15° C. or higher and 40° C. or lower.

A battery pack of an electric automobile or the like includes a battery unit housing and a battery unit housed in the battery unit housing. The battery unit includes a plurality of arranged battery cells. The battery unit housing is connected to a cooler through a gap filler that is the thermally conductive member.

Examples of the cooler include, but are not limited to, a heat sink, a heat dissipating body, a cooling fan, a heat pipe, a cooling fin, and a metal cover.

A substrate to which the gap filler is applied is not particularly limited, and examples thereof include a resin such as a polyethylene terephthalate (PET), a poly(1,4-butylene terephthalate) (PBT), and a polycarbonate, ceramics, glass, and a metal such as aluminum.

The gap filler obtained by curing the thermally conductive silicone composition of the present invention exhibits favorable adhesive properties to a substrate having a condensable group on a surface under a vibration condition. Therefore, when the battery unit housing has an iron surface where at least a part is covered by cationic electrodeposition coating and when the cooler has an aluminum surface, the gap filler exerts particularly high adhesive properties under a vibration condition.

The present invention is a method for improving adhesive properties of a cured product of a thermally conductive silicone composition containing a thermally conductive filler to a metal or a metal surface coated with a cationic electrodeposition coating material under a vibration condition and improving storage stability of the thermally conductive silicone composition, the method comprising: adding,

- to the thermally conductive silicone composition containing
  - (A) a diorganopolysiloxane having an alkenyl group bonded to a silicon atom,
  - (B) a diorganopolysiloxane having a hydrogen atom bonded to a silicon atom, and
  - (D) an addition catalyst,
- (C) at least one selected from
  - (C-1) an organosilicon compound having two or more groups that are at least one selected from a methoxy group and an ethoxy group and not having a hydrocarbon group having 3 or more carbon atoms or a vinyl group, and
  - (C-2) a hydrolysate of the organosilicon compound (C-1), and
- (F) a condensation catalyst.

When the components (C) and (F) are added, a silanol produced by hydrolysis of the component (C) is reacted with a condensable group on the surface of a substrate, and adhesion to the substrate successfully proceeds. Since a cured product having favorable tensile strength and elongation is provided by curing the thermally conductive silicone composition of the present invention, an adhesion state to a substrate can be maintained under a vibration condition.

EXAMPLES

The present invention will be specifically described based on Examples, but the present invention is not limited to the following Examples. Tables 1 and 2 show mixing ratios of components and evaluation results in Examples and Comparative Examples. Numerals of the mixing ratios shown in Tables 1 and 2 are expressed in part by mass.

A viscosity described herein is a value measured at 25° C. and a shear speed of 10/s with a rotation viscometer (JIS K7117-2).

<Method for Producing Cured Product (Thermally Conductive Member) of Thermally Conductive Composition>

A first liquid and a second liquid described in each of Examples and Comparative Examples were weighed at a ratio of 1:1, sufficiently mixed with a stirrer, and then degassed with a vacuum pump, to produce each thermally conductive composition. The thermally conductive compositions were each cured at 23° C. for 24 hours so as to obtain a specimen for each evaluation item, to obtain a cured product as a thermally conductive member.

<Method for Evaluating Adhesive Properties, Heat Resistance, and Moisture Resistance Under Vibration Condition by Measurement Test of Tensile Shear Bond Displacement and Measurement Test of Tensile Shear Bond Stress>

For a measurement test of tensile shear bond displacement and a measurement test of tensile shear bond stress, specimens satisfying the following conditions were used.

Measurement of tensile shear bond displacement and tensile shear bond stress after storage for 24 hours: the first liquid and the second liquid were each produced by the following procedure, allowed to stand at 23° C. for 24 hours, mixed, degassed, and cured to obtain a specimen (in Tables, represented as “after 24 hours”)

Measurement of tensile shear bond displacement and tensile shear bond stress after storage for 7 days: the first liquid and the second liquid were each produced by the following procedure, stored in a closed container at 40° C. for 7 days, mixed, degassed, and cured to obtain a specimen (in Tables, represented as “after 7 days”)

Measurement of tensile shear bond displacement and tensile shear bond stress after storage for 6 months: the first liquid and the second liquid were each produced by the following procedure, stored in a closed container at 40° C. for 6 months, mixed, degassed, and cured to obtain a specimen (in Tables, represented as “after 6 months”)

Measurement of tensile shear bond displacement and tensile shear bond stress after exposure to moisture and heat: a specimen produced similarly to the specimen after storage for 24 hours was cured and allowed to stand at a temperature of 85° C. and a moisture of 95% for 4 days to obtain a specimen (in Tables, represented as “after curing followed by exposure to moisture and heat”)

The measurements using the specimens “after 24 hours”, “after 7 days”, and “after 6 months” are for evaluation of storage stability before curing (7 days) and long-term storage stability (6 months) when a thermally conductive silicone composition is a two-component thermally conductive silicone composition.

The tensile shear bond displacement is required to be 0.30 mm or more under a condition of “after 24 hours”. The tensile shear bond displacement is evaluated to be further preferably 0.40 mm or more, and most preferably 0.50 mm or more.

The tensile shear bond stress is required to be 0.10 MPa or more under a condition of “after 24 hours”. The tensile shear bond stress is evaluated to be further preferably 0.15 MPa or more, and most preferably 0.20 MPa or more.

A thermally conductive member in which the tensile shear bond displacement is 0.30 mm or more and the tensile shear bond stress is 0.10 MPa or more has favorable adhesive properties to a surface of a substrate under a vibration condition.

When measurement results satisfy the aforementioned requirements after the first liquid and the second liquid are produced and stored for 7 days, the storage stability is deemed favorable.

When measurement results satisfy the aforementioned requirements after the first liquid and the second liquid are produced and stored for 6 months, the long-term storage stability is deemed favorable.

The measurement using the specimen “after curing followed by exposure to moisture and heat” is performed for evaluation of heat resistance and moisture resistance of thermally conductive member obtained by curing a thermally conductive silicone composition. When measurement results satisfy the aforementioned requirements after exposure to moisture and heat, the heat resistance and the moisture resistance are deemed favorable.

<Method for Measurement Test of Tensile Shear Bond Displacement>

A thermally conductive silicone composition is placed between an aluminum specimen and an iron specimen subjected to cationic electrodeposition coating such that the coating area is 25 mm in length and 25 mm in width and the thickness is 0.6 mm, and cured at 23° C. for 24 hours, to obtain a specimen for a tensile shear bond test.

The specimen for a tensile shear bond test was subjected to a tensile shear bond test by a method in accordance with JIS K6850, to obtain a graph of S-S curve.

In the graph of S-S curve, the stroke amount at a point where the stress is maximum is taken as a tensile shear bond displacement of the cured product of the silicone composition corresponding to the specimen for a tensile shear bond test.

<Method for Measurement Test of Tensile Shear Bond Stress>

A thermally conductive silicone composition is placed between an aluminum specimen and an iron specimen subjected to cationic electrodeposition coating such that the coating area is 25 mm in length and 25 mm in width and the thickness is 0.6 mm, and cured at 23° C. for 24 hours, to obtain a specimen for a tensile shear bond test.

The specimen for a tensile shear bond test is subjected to a tensile shear bond test by a method in accordance with JIS K6850, to obtain a graph of S-S curve.

In the graph of S-S curve, the maximum value of stress is taken as a tensile shear bond stress of the cured product of the silicone composition corresponding to the specimen for a tensile shear bond test.

<Method for Measuring Thermal Conductivity>

A first liquid and a second liquid described in each of Examples and Comparative Examples were weighed at a ratio of 1:1, sufficiently mixed by a stirrer, and then degassed by a vacuum pump. The resultant was poured into a columnar press mold having a diameter of 30 mm and a height of 6 mm, and then cured at 23° C. for 24 hours, to obtain each columnar cured product. The thermal conductivity of the cured product was measured by a measurement device (TPS-500 manufactured by Kyoto Electronics Manufacturing Co., Ltd.) on the basis of a hot disc method in accordance with ISO 22007-2. A sensor was disposed between two columnar cured products that were produced as described above, and the thermal conductivity was measured by the measurement device.

The thermal conductivity is preferably 2.0 W/m·K or more.

<Method for Evaluating Precipitation Suppression During Storage by Measurement Test of Thermal Conductivity>

In order to confirm the precipitation properties of a thermally conductive filler and other fillers of a thermally conductive silicone composition, precipitation properties are evaluated during storage of the thermally conductive silicone composition. When the evaluation result of precipitation properties is favorable, the fillers are less precipitated during storage, and the precipitation suppression is determined to be favorable.

About 0.7 L of each of the first liquid and the second liquid described in each of Examples and Comparative Examples was put in each container in which an inner package was put in a 1-L metal cylindrical metal can. A polyethylene film with a thickness of 0.05 mm was placed on an upper portion thereof, and the metal can was closed with a lid of the metal can and was allowed to stand at 40° C. for 6 months.

After leaving for 6 months, the content was taken out from the top so as to prevent upper and lower portions from being mixed, and divided into three. The upper one-third of the content was used as an upper portion, and the lower one-third of the content was used as a lower portion.

The first liquid of the upper portion and the second liquid of the upper portion were weighed at a ratio of 1:1, sufficiently mixed with a stirrer, and then degassed with a vacuum pump. The resultant was poured into a columnar press mold having a diameter of 30 mm and a height of 6 mm, and then cured at 23° C. for 24 hours, to obtain a columnar cured product. A result obtained by measurement of thermal conductivity of the cured product in accordance with the method for measuring a thermal conductivity is shown as "⅓ of upper portion" in Tables.

For the first liquid of the lower portion and the second liquid of the lower portion, measurement was performed in the same manner. The result is shown as "⅓ of lower portion" in Tables.

The thermal conductivity is preferably 2.0 W/m·K or more.

When the thermal conductivities of the upper portion and the lower portion satisfy 2.0 W/m·K or more after the first liquid and the second liquid are produced and stored for 6 months, the precipitation suppression is deemed favorable.

<Method for Measuring Tensile Strength and Elongation>

A first liquid and a second liquid described in each of Examples and Comparative Examples were weighed at a ratio of 1:1, sufficiently mixed with a stirrer, and then degassed with a vacuum pump. The resultant was poured into a mold having a length of 120 mm, a width of 120 mm, and a thickness of 2 mm, covered with a PET film and an iron plate in this order, compression-molded with a press machine at 5 MPa for 5 seconds, and then cured at 100° C. for 1 hour, to produce a sheet-shaped cured product. The produced cured product was punched with a dumbbell No. 5, to obtain a dumbbell-shaped cured product (hereinafter referred to as dumbbell).

The dumbbell was fastened with Autograph AGS-X manufactured by Shimadzu corporation at a distance between chucks of 75 mm and subjected to a tensile test at a tensile speed of 50 mm/min. A stress during rupture of the dumbbell is taken as a tensile strength (MPa), and an elongation (%) is determined by dividing the stroke amount at that time by the distance between chucks. Other conditions are in accordance with JIS K6249.

<Method for Evaluating Amount of Low Molecular Weight Cyclic Siloxane>

A first liquid and A second liquid described in each of Examples and Comparative Examples were weighed at a ratio of 1:1, sufficiently mixed with a stirrer, and then degassed with a vacuum pump. The resultant was poured into a plate-shaped press mold having a width of 100 mm, a length of 100 mm, and a height of 6 mm and then cured at 23° C. for 24 hours, to obtain a cured product. The cured product was weighed in an amount of 0.3 g and placed in 10 mL of an acetone solution in a sample vial. The vial was closed, and extraction was performed over 12 hours. Using this extracted solution, low molecular weight cyclic compounds ((D4) to (D8)) were weighed by gas chromatography.

<Method for Producing Cured Product of Curable Silicone Composition>

Example 1

A first liquid and a second liquid described in each of Examples and Comparative Examples were each produced in accordance with each chemical composition shown in Tables by the following procedures. The unit of mixing ratio of each component shown in Tables is part by mass.

First Liquid for Example 1

A diorganopolysiloxane having an alkenyl group as the component (A), a platinum-divinyltetramethyldisiloxane complex as the component (D), a condensation catalyst as the component (F), a hydrophobic silica (H) having a BET specific surface area 300 $m^2/g$ as an optional component, and a half amount of n-octyltriethoxysilane as an optional silane coupling agent were each weighed, added together, and kneaded at room temperature for 30 minutes with a planetary mixer.

The component (A) is a mixture of a linear dimethylpolysiloxane (A-1) having an alkenyl group at each of both terminals with a viscosity of 120 mPa·s, and a linear dimethylpolysiloxane (A-2) having an alkenyl group at each of both terminals with a viscosity of 1,000 mPa·s.

The component (F) is ORGATIX TC-750 (titanium diisopropoxybis(ethyl acetoacetate)) (F-1) manufactured by Matsumoto Fine Chemical Co., Ltd. and is an alkoxy group-containing titanium chelate compound.

After that, respective half amounts of (E-1) amorphous zinc oxide having an average particle diameter of 0.6 μm, (E-2) amorphous aluminum oxide having an average particle diameter of 4 μm, and (E-3) spherical aluminum oxide having an average particle diameter of 50 μm were added as the component (E) and kneaded for 15 minutes at room temperature with a planetary mixer.

After that, a half amount of the silane-coupling agent, and respective half amounts of the above-mentioned (E-1), (E-2), and (E-3) as the component (E) were added and kneaded for 15 minutes at room temperature with a planetary mixer to produce a first liquid.

As the amorphous zinc oxide (E-1), Pharma 4 API manufactured by Grillo Zinkoxid GmbH (average particle diameter (D50): 0.6 μm, BET specific surface area is 4.1 $m^2/g$) was used.

As the amorphous aluminum oxide (E-2), CL 3000 SG manufactured by ALMATIS GmbH (average particle diameter (D50): 3.9 μm, BET specific surface area is 0.9 $m^2/g$) was used.

As the spherical aluminum oxide (E-3), BAK-40 manufactured by Shanghai Bestry Performance Materials Co., Ltd. (average particle diameter (D50): 40 μm, BET specific surface area is 0.12 $m^2/g$) was used.

Second Liquid for Example 1

As the component (A), in addition to the same diorganopolysiloxanes (A-1) and (A-2) having an alkenyl group as the first liquid, a diorganopolysiloxane (A-3) having a silanol group at both terminals were used. These components (A), a linear diorganopolysiloxane having two hydrogen atoms at both terminals with a viscosity of 70 mPa·s (the amount of hydrogen is 0.5 mmol/g) as the component (B), the component (C), 1,3,5,7,9-pentamethylcyclopentasiloxane as the component (G-1), 1,3,5,7,9,11-hexamethylcyclohexasiloxane as the component (G-2), the component (H), a cross-linking agent (F) as the optional component, and a half amount of an optional silane coupling agent were each weighed, added together, and kneaded for 30 minutes at room temperature with a planetary mixer. The component (H) and the silane coupling agent are the same as those for the first liquid.

The component (C) includes (C-1) TES 28 (registered trademark) manufactured by Wacker Chemie AG (tetraethoxysilane) and (C-2) TES 40 (registered trademark) manufactured by the same company (oligomer which is a hydrolysate of tetraethoxysilane).

The cross-linking agent (F) is a dimethylpolysiloxane having 12 to 18 hydrogen atoms bonded to the silicon atoms at a side chain with a viscosity of 200 mPa·s.

After that, a half amount of the silane coupling agent, and the same thermally conductive filler as that for the first liquid as the component (E) were added and kneaded for 15 minutes at room temperature with a planetary mixer to produce a second liquid.

In Example 1, when the thermally conductive silicone composition after storage for 24 hours was cured, the tensile shear bond displacement was 0.65 mm, and the tensile shear bond stress was 0.24 MPa, which were very favorable values. The adhesive properties under a vibration condition were remarkably favorable. For the measurement results after storage of the thermally conductive silicone composition for 7 days, change did not appear, and the storage stability was remarkably favorable. For the tensile shear bond displacement and the tensile shear bond stress after storage for 6 months, remarkably favorable values were maintained, and the long-term storage stability was remarkably favorable.

The thermal conductivity of the thermally conductive member after curing were as favorable value of 2.0 W/m·K or more, and the heat dissipation properties were favorable. When the upper portion and the lower portion of the thermally conductive silicone composition after storage for 6 months were used, all the thermal conductivities after curing exhibited 2.0 W/m·K or more. Therefore, the precipitation suppression was considered as being favorable although precipitation of fillers was sufficiently suppressed during storage. The elongation and the tensile strength were favorable values. This shows that the rubber strength is favorable.

Example 2

In Example 2, a first liquid and a second liquid were prepared in the same manner as that in Example 1 except that (A-2), (E-1), (E-3), (H), the silane-coupling agent, (C-1), (G-1), (G-2), and the cross-linking agent were not added. The amounts of the components were adjusted so that the total amount of the components (A), (C). and (E) was the same as that in Example 1.

In Example 2, the values of the tensile shear bond displacement, tensile shear bond stress, elongation, and tensile strength were generally lower than those in Example 1, but fell within ranges sufficient for use as a gap filler. Heat resistance and moisture resistance thereof also decreased. It is considered to be mainly caused by the fact that the hydrophobic silica and the component (G) were not added.

In addition, the thermal conductivity of the thermally conductive member was slightly lower than that of Example 1, but fell within the acceptable range.

The storage stability and long-term storage stability were lower than those in Example 1, but fell within the acceptable ranges.

The precipitation suppression was lower than that in Example 1.

Example 3

In Example 3, a first liquid and a second liquid were prepared in the same manner as that in Example 1 except that the component (C-2) was not added.

Example 4

In Example 4, a first liquid and a second liquid were prepared in the same manner as that in Example 1 except that the component (C-1) was not added.

In Examples 3 and 4, the tensile shear bond displacement and the tensile shear bond stress were slightly lower than those in Example 1. It is considered to be caused by the fact that the component (C-2) or component (C-1), which contributes to adhesive properties or the like, was not added.

Example 5

In Example 5, a first liquid and a second liquid were prepared in the same manner as that in Example 1 except that (F-2) Cat-77 (zirconium tetrabutoxide) manufactured by Wacker was used instead of ORGATIX TC-750 as the condensation catalyst (F).

Example 6

In Example 6, a first liquid and a second liquid were prepared in the same manner as that in Example 1 except that (F-3) titanium tetra n-butoxide manufactured by KANTO KAGAKU was used as the condensation catalyst (F) instead of ORGATIX TC-750.

Example 7

In Example 7, a first liquid and a second liquid were prepared in the same manner as that in Example 1 except that (F-4) ZC-200 manufactured by Matsumoto Fine Chemical Co., Ltd. (a zirconium octylate compound) was used instead of ORGATIX TC-750 as the condensation catalyst (F).

Example 8

In Example 8, a first liquid and a second liquid were prepared in the same manner as that in Example 1 except that (F-5) ZC-540 (zirconium monoacetylacetonate) manufactured by Matsumoto Fine Chemical Co., Ltd. was used instead of ORGATIX TC-750 as the condensation catalyst (F).

Example 9

In Example 9, a first liquid and a second liquid were prepared in the same manner as that in Example 1 except that (F-6) ZC-700 (zirconium tetraacetylacetonate) manufactured by Matsumoto Fine Chemical Co., Ltd. was used instead of ORGATIX TC-750 as the condensation catalyst (F).

Example 10

In Example 10, a first liquid and a second liquid were prepared in the same manner as that in Example 1 except that (F-2) and (F-6) were used instead of ORGATIX TC-750 as the condensation catalyst (F).

In Examples 5 to 10, the tensile shear bond displacement and the tensile shear bond stress were lower than those in Example 1, but the tensile shear bond displacements and the tensile shear bond stresses after storage for 24 hours and after storage for 7 days were beyond criteria for evaluation. The compositions have properties (storage stability) sufficient for use as a gap filler.

On the other hand, the tensile shear bond displacement and the tensile shear bond stress after storage for 6 months were lowered, and particularly in Examples 5 to 7, the tensile shear bond displacement and the tensile shear bond stress were below criteria for evaluation. Therefore, the long-term storage stability for 6 months was not favorable for these examples.

The heat resistance and the moisture resistance were lower than those in Example 1.

In Example 10, a mixture of the condensation catalyst having an alkoxy group and the condensation catalyst that was a chelate compound was used. All the evaluation results after storage for 7 days and after storage for 6 months were lower than those in Example 1 using the condensation catalyst having an alkoxy group and a chelate structure within one molecule.

When the condensation catalyst was a chelate metal compound having an alkoxy group, the adhesive properties under a vibration condition, the storage stability, the heat resistance, and the moisture resistance were all the most favorable.

Example 11

In Example 11, a first liquid and a second liquid were prepared in the same manner as that in Example 1 except that the component (A-3) was not added to the second liquid.

In Example 11, as compared to Example 1, a difference in thermal conductivity between the upper portion and the lower portion of the thermally conductive silicone composition after 6 months of storage, which were each cured, slightly became larger. It is considered to be caused by the fact that (A-3) was not added, and thus the effect of suppressing precipitation of the fillers in the thermally conductive silicone composition was reduced.

Example 12

In Example 12, a first liquid and a second liquid were prepared in the same manner as that in Example 1 except that the (H) hydrophobic silica was not added.

In Example 12, as compared to Example 1, a difference in thermal conductivity between the upper portion and the lower portion of the thermally conductive silicone composition after 6 months of storage, which were each cured, slightly became larger, and the tensile strength was also slightly lowered. Hydrophobic silica is also believed to contribute to the suppression of filler precipitation in the thermally conductive silicone compositions.

Example 13

In Example 13, a first liquid and a second liquid were prepared in the same manner as that in Example 1 except that (G-3) 1,3,5,7,9,11,13-heptamethylcycloheptasiloxane was added instead of the components (G-1) and (G-2).

In Example 13, as compared to Example 1, tensile shear bond displacement and tensile shear bond stress slightly was lowered, and heat resistance and moisture resistance also slightly was lowered.

Comparative Example 1

In Comparative Example 1, a first liquid and a second liquid were prepared in the same manner as that in Example 1 except that the components (C) and (F) were not added.

Comparative Example 2

In Comparative Example 2, a first liquid and a second liquid were prepared in the same manner as that in Example 1 except that the component (F) was not added.

In Comparative Example 1 and Comparative Example 2, the values of the tensile shear bond displacement were lowered, and the tensile shear bond stresses were lower than 0.10 MPa which is the reference value. Therefore, the adhesive properties under a vibration condition is insufficient.

This result shows that it is necessary to add both the component (C) and the component (F) in order to exert adhesive properties under a vibration condition.

Comparative Example 3

In Comparative Example 3, a first liquid and a second liquid were prepared in the same manner as that in Example 1 except that (C-1(R)) tetrapropoxysilane was added instead of the component (C-1), and the component (C-2) was not added.

In Comparative Example 3, after the thermally conductive silicone composition was stored for 7 days, the tensile shear bond stresses in the cured product was lower than 0.10 MPa which is the reference value, and the storage stability was insufficient.

Comparative Example 4

In Comparative Example 4, a first liquid and a second liquid were prepared in the same manner as that in Example 1 except that the component (C) was not added.

In Comparative Example 4, the tensile shear bond displacement was lower than 0.30 mm when the thermally conductive silicone composition was stored for 6 months, and the tensile shear bond stress after 7 days of storage was lower than 0.1 MPa. It can be considered that storage stability is insufficient.

The thermal conductivity of the thermally conductive member obtained by curing the thermally conductive silicone composition was higher than or equal to 2.0 W/m·k, which was favorable value, in all Examples and Comparative Examples.

The total amount of the low molecular-weight cyclic siloxanes (D4) to (D8) was less than or equal to 1,000 ppm in all Examples and Comparative Examples. In all these cases, the flash point of the thermally conductive silicone composition was 100° C. or higher.

TABLE 1

| | | | Example | | | | | | | | |
|---|---|---|---|---|---|---|---|---|---|---|---|
| | | | 1 | 2 | 3 | 4 | 5 | 6 | 7 | 8 | 9 |
| | First liquid | | | | | | | | | | |
| A-1 | Organopolysiloxane having alkenyl group at both terminals | Viscosity at 25° C.: 120 mPa · s | 10.0 | 12.9 | 10.0 | 10.0 | 10.0 | 10.0 | 10.0 | 10.0 | 10.0 |
| A-2 | Organopolysiloxane having alkenyl group at both terminals | Viscosity at 25° C.: 1,000 mPa · s | 2.8 | 0 | 2.8 | 2.8 | 2.8 | 2.8 | 2.8 | 2.8 | 2.8 |
| D | Addition catalyst | Platinum catalyst | 0.18 | 0.18 | 0.18 | 0.18 | 0.18 | 0.18 | 0.18 | 0.18 | 0.18 |
| E-1 | Amorphous zinc oxide | | 22.1 | 0 | 22.1 | 22.1 | 22.1 | 22.1 | 22.1 | 22.1 | 22.1 |
| E-2 | Amorphous aluminum oxide | | 35.2 | 86.8 | 35.2 | 35.2 | 35.2 | 35.2 | 35.2 | 35.2 | 35.2 |
| E-3 | Spherical aluminum oxide | | 28.9 | 0 | 28.9 | 28.9 | 28.9 | 28.9 | 28.9 | 28.9 | 28.9 |
| F-1 | Titanium diisopropoxy bis(ethylacetoacetate) | Alkoxy group-containing Ti chelate catalyst | 0.08 | 0.08 | 0.08 | 0.08 | 0 | 0 | 0 | 0 | 0 |
| F-2 | Zirconium butoxide | Alkoxy group-containing Zr catalyst | 0 | 0 | 0 | 0 | 0.08 | 0 | 0 | 0 | 0 |
| F-3 | Titanium tetra-n-butoxide | Alkoxy group-containing Ti catalyst | 0 | 0 | 0 | 0 | 0 | 0.08 | 0 | 0 | 0 |
| F-4 | Zirconium octylate compound | Acylate-containing Zr catalyst | 0 | 0 | 0 | 0 | 0 | 0 | 0.08 | 0 | 0 |
| F-5 | Zirconium monoacetylacetonate | Zr chelate catalyst | 0 | 0 | 0 | 0 | 0 | 0 | 0 | 0.08 | 0 |
| F-6 | Zirconium tetraacetylacetonate | Zr chelate catalyst | 0 | 0 | 0 | 0 | 0 | 0 | 0 | 0 | 0.08 |
| H | Hydrophobic silica (BET 300 m2/g) | | 0.14 | 0 | 0.14 | 0.14 | 0.14 | 0.14 | 0.14 | 0.14 | 0.14 |
| | Silane coupling agent | n-octyl-triethoxysilane | 0.6 | 0 | 0.6 | 0.6 | 0.6 | 0.6 | 0.6 | 0.6 | 0.6 |
| | Total | | 100 | 100 | 100 | 100 | 100 | 100 | 100 | 100 | 100 |
| | Second liquid | | | | | | | | | | |
| A-1 | Organopolysiloxane having alkenyl group at both terminals | Viscosity at 25° C.: 120 mPa · s | 0.5 | None | 0.5 | 0.5 | 0.5 | 0.5 | 0.5 | 0.5 | 0.5 |
| A-2 | Organopolysiloxane having alkenyl group at both terminals | Viscosity at 25° C.: 1,000 mPa · s | 2.4 | 4.8 | 2.4 | 2.4 | 2.4 | 2.4 | 2.4 | 2.4 | 2.4 |
| A-3 | Organopolysiloxane having alkenyl group at both terminals | OH group-containing | 1.8 | None | 1.8 | 1.8 | 1.8 | 1.8 | 1.8 | 1.8 | 1.8 |
| B | Organopolysiloxane having hydrosilyl group at both terminals | | 6.3 | 6.4 | 6.3 | 6.3 | 6.3 | 6.3 | 6.3 | 6.3 | 6.3 |
| C-1 | Tetraethoxysilane | | 0.03 | 0 | 0.17 | None | 0.03 | 0.03 | 0.03 | 0.03 | 0.03 |
| C-1(R) | Tetrapropoxysilane | | 0 | 0 | 0 | 0 | 0 | 0 | 0 | 0 | 0 |
| C-2 | Oligomer of tetraethoxysilane | | 0.14 | 0.17 | None | 0.14 | 0.14 | 0.14 | 0.14 | 0.14 | 0.14 |
| E-1 | Amorphous zinc oxide | | 22.5 | None | 22.5 | 22.5 | 22.5 | 22.5 | 22.5 | 22.5 | 22.5 |
| E-2 | Amorphous aluminum oxide | | 35.5 | 88.63 | 35.5 | 35.5 | 35.5 | 35.5 | 35.5 | 35.5 | 35.5 |
| E-3 | Spherical aluminum oxide | | 29.4 | 0 | 29.4 | 29.4 | 29.4 | 29.4 | 29.4 | 29.4 | 29.4 |
| G-1 | 1,3,5,7,9-pentamethyl cyclopentasiloxane | | 0.02 | 0 | 0.02 | 0.02 | 0.02 | 0.02 | 0.02 | 0.02 | 0.02 |
| G-2 | 1,3,5,7,9,11-hexamethyl cyclohexasiloxane | | 0.016 | 0 | 0.016 | 0.016 | 0.016 | 0.016 | 0.016 | 0.016 | 0.016 |
| G-3 | 1,3,5,7,9,11,13-heptamethyl cycloheptasiloxane | | 0 | 0 | 0 | 0 | 0 | 0 | 0 | 0 | 0 |
| H | Hydrophobic silica (BET 300 m2/g) | | 0.26 | 0 | 0.26 | 0.26 | 0.26 | 0.26 | 0.26 | 0.26 | 0.26 |
| | Cross-linking agent | | 0.27 | | 0.27 | 0.27 | 0.27 | 0.27 | 0.27 | 0.27 | 0.27 |
| | Silane coupling agent | | 0.89 | 0 | 0.89 | 0.89 | 0.89 | 0.89 | 0.89 | 0.89 | 0.89 |
| | Total | | 100 | 100 | 100 | 99.97 | 100 | 100 | 100 | 100 | 100 |

TABLE 1-continued

| Evaluation result | | Example | | | | | | | | |
|---|---|---|---|---|---|---|---|---|---|---|
| test item | Suitable range | 1 | 2 | 3 | 4 | 5 | 6 | 7 | 8 | 9 |
| (Initial value) tensile shear bond displacement (after 24 hours) (mm) | ≥0.30 | 0.65 | 0.45 | 0.60 | 0.50 | 0.54 | 0.49 | 0.45 | 0.34 | 0.30 |
| (Storage stability) tensile shear bond displacement (after 7 days) (mm) | ≥0.30 | 0.65 | 0.40 | 0.60 | 0.50 | 0.30 | 0.30 | 0.30 | 0.30 | 0.30 |
| (Long-term storage stability) tensile shear bond displacement (before curing and after storage for 6 months) (mm) | ≥0.30 | 0.52 | 0.35 | 0.50 | 0.40 | 0.20 | 0.20 | 0.25 | 0.30 | 0.30 |
| (Initial) tensile shear bond stress (after 24 hours) (MPa) | ≥0.10 | 0.24 | 0.15 | 0.20 | 0.15 | 0.15 | 0.13 | 0.12 | 0.10 | 0.15 |
| (Storage stability) tensile shear bond stress (after 7 days) (MPa) | ≥0.10 | 0.24 | 0.14 | 0.20 | 0.15 | 0.15 | 0.10 | 0.10 | 0.10 | 0.13 |
| (Long-term storage stability) tensile shear bond stress (after 6 months) (MPa) | ≥0.10 | 0.18 | 0.12 | 0.16 | 0.10 | 0.005 | 0.005 | 0.005 | 0.10 | 0.10 |
| (Heat resistance, moisture resistance) tensile shear bond displacement (after curing, after exposure to wet and heat) | ≥0.30 | 1.0 | 0.60 | 0.90 | 0.88 | 0.32 | 0.32 | 0.42 | 0.40 | 0.43 |
| (Heat resistance, moisture resistance) tensile shear bond stress (after curing, after exposure to wet and heat) | ≥0.10 | 0.40 | 0.30 | 0.35 | 0.36 | 0.11 | 0.11 | 0.11 | 0.20 | 0.20 |
| Thermal Conductivity (W/m · K) | ≥2.0 | 2.20 | 2.00 | 2.20 | 2.20 | 2.20 | 2.20 | 2.20 | 2.20 | 2.20 |
| (Precipitation suppression) thermal conductivity after 6 months (⅓ of upper portion) | ≥2.0 | 2.15 | 1.80 | 2.15 | 2.15 | 2.15 | 2.15 | 2.15 | 2.15 | 2.15 |
| (Precipitation suppression) thermal conductivity after 6 months (⅓ of lower portion) | ≥2.0 | 2.25 | 2.10 | 2.25 | 2.25 | 2.25 | 2.25 | 2.25 | 2.25 | 2.25 |
| Elongation | ≥30% | 50% | 30% | 50% | 50% | 50% | 50% | 50% | 50% | 50% |
| Tensile strength | ≥0.20 MPa | 0.40 | 0.20 | 0.40 | 0.40 | 0.40 | 0.40 | 0.40 | 0.40 | 0.40 |
| Toroidal amount (ppm) | ≤0.1% | 300 | 340 | 330 | 320 | 340 | 320 | 320 | 310 | 300 |

TABLE 2

| | | | Example | | | | Comparative Example | | | |
|---|---|---|---|---|---|---|---|---|---|---|
| | | | 10 | 11 | 12 | 13 | 1 | 2 | 3 | 4 |
| First liquid | | | | | | | | | | |
| A-1 | Organopolysiloxane having alkenyl group at both terminals | Viscosity at 25° C.: 120 mPa · s | 10.0 | 10.0 | 10.0 | 10.0 | 10.0 | 10.0 | 10.0 | 10.0 |
| A-2 | Organopolysiloxane having alkenyl group at both terminals | Viscosity at 25° C.: 1,000 mPa · s | 2.8 | 2.8 | 2.8 | 2.8 | 2.8 | 2.8 | 2.8 | 2.8 |
| D | Addition catalyst | Platinum catalyst | 0.18 | 0.18 | 0.18 | 0.18 | 0.19 | 0.19 | 0.19 | 0.19 |
| E-1 | Amorphous zinc oxide | | 22.1 | 22.1 | 22.1 | 22.1 | 22.1 | 22.1 | 22.1 | 22.1 |
| E-2 | Amorphous aluminum oxide | | 35.2 | 35.2 | 35.3 | 35.2 | 35.3 | 35.2 | 35.2 | 35.2 |
| E-3 | Spherical aluminum oxide | | 28.9 | 28.9 | 28.9 | 28.9 | 28.9 | 28.9 | 28.9 | 28.9 |
| F-1 | Titanium diisopropoxy bis(ethylacetoacetate) | Alkoxy group-containing Ti chelate catalyst | 0 | 0.08 | 0.08 | 0.08 | None | None | 0.08 | 0.08 |
| F-2 | Zirconium butoxide | Alkoxy group-containing Zr catalyst | 0.04 | 0 | 0 | 0 | | | | |
| F-3 | Titanium tetra-n-butoxide | Alkoxy group-containing Ti catalyst | 0 | 0 | 0 | 0 | | | | |
| F-4 | Zirconium octylate compound | Acylate-containing Zr catalyst | 0 | 0 | 0 | 0 | | | | |
| F-5 | Zirconium monoacetylacetonate | Zr chelate catalyst | 0 | 0 | 0 | 0 | | | | |
| F-6 | Zirconium tetraacetylacetonate | Zr chelate catalyst | 0.04 | 0 | 0 | 0 | | | | |
| H | Hydrophobic silica (BET 300 m2/g) | | 0.14 | 0.14 | 0 | 0.14 | 0.14 | 0.14 | 0.14 | 0.14 |
| | Silane coupling agent | n-octyltriethoxysilane | 0.6 | 0.6 | 0.6 | 0.6 | 0.6 | 0.6 | 0.6 | 0.6 |
| | Total | | 100 | 100 | 100 | 100 | 100.03 | 99.93 | 100.01 | 100.01 |
| Second liquid | | | | | | | | | | |
| A-1 | Organopolysiloxane having alkenyl group at both terminals | Viscosity at 25° C.: 120 mPa · s | 0.5 | 0.5 | 0.5 | 0.5 | 0.5 | 0.5 | 0.5 | 0.5 |
| A-2 | Organopolysiloxane having alkenyl group at both terminals | Viscosity at 25° C.: 1,000 mPa · s | 2.4 | 4.2 | 2.4 | 2.4 | 2.4 | 2.4 | 2.4 | 2.4 |
| A-3 | Organopolysiloxane having alkenyl group at both terminals | OH group-containing | 1.8 | 0 | 1.8 | 1.8 | 1.8 | 1.8 | 1.8 | 1.8 |

TABLE 2-continued

| | | | | | | | | | | |
|---|---|---|---|---|---|---|---|---|---|---|
| B | Organopolysiloxane having hydrosilyl group at both terminals | | 6.3 | 6.3 | 6.3 | 6.3 | 6.3 | 6.3 | 6.3 | 6.3 |
| C-1 | Tetraethoxysilane | | 0.03 | 0.03 | 0.03 | 0.03 | 0 | 0.03 | 0 | 0 |
| C-1(R) | Tetrapropoxysilane | | 0 | 0 | 0 | 0 | 0 | 0 | 0.17 | 0 |
| C-2 | Oligomer of tetraethoxysilane | | 0.14 | 0.14 | 0.14 | 0.14 | 0 | 0.14 | 0 | 0 |
| E-1 | Amorphous zinc oxide | | 22.5 | 22.5 | 22.5 | 22.5 | 22.5 | 22.5 | 22.5 | 22.5 |
| E-2 | Amorphous aluminum oxide | | 35.5 | 35.5 | 35.5 | 35.5 | 35.6 | 35.5 | 35.5 | 35.67 |
| E-3 | Spherical aluminum oxide | | 29.4 | 29.4 | 29.4 | 29.4 | 29.4 | 29.4 | 29.4 | 29.4 |
| G-1 | 1,3,5,7,9-pentamethyl cyclopentasiloxane | | 0.02 | 0.02 | 0.02 | None | 0.02 | 0.02 | 0.02 | 0.02 |
| G-2 | 1,3,5,7,9,11-hexamethyl cyclohexasiloxane | | 0.016 | 0.016 | 0.016 | 0 | 0.016 | 0.016 | 0.016 | 0.016 |
| G-3 | 1,3,5,7,9,11,13-heptamethyl cycloheptasiloxane | | 0 | 0 | 0 | 0.04 | 0 | 0 | 0 | 0 |
| H | Hydrophobic silica (BET 300 m2/g) | | 0.26 | 0.26 | 0 | 0.26 | 0.26 | 0.26 | 0.26 | 0.26 |
| | Cross-linking agent | | 0.27 | 0.27 | 0.27 | 0.27 | 0.27 | 0.27 | 0.27 | 0.27 |
| | Silane coupling agent | | 0.89 | 0.89 | 0.89 | 0.89 | 0.89 | 0.89 | 0.89 | 0.89 |
| | Total | | 100 | 100 | 99.74 | 100.03 | 99.956 | 100.026 | 100.026 | 100.026 |
| | Evaluation result | | Example | | | | Comparative Example | | | |
| | Test item | Suitable range | 10 | 11 | 12 | 13 | 1 | 2 | 3 | 4 |
| | (Initial value) tensile shear bond displacement (after 24 hours) (mm) | ≥0.30 | 0.60 | 0.60 | 0.65 | 0.58 | 0.35 | 0.35 | 0.38 | 0.30 |
| | (Storage stability) tensile shear bond displacement (after 7 days) (mm) | ≥0.30 | 0.40 | 0.60 | 0.65 | 0.58 | 0.35 | 0.35 | 0.38 | 0.30 |
| | (Long-term storage stability) tensile shear bond displacement (before curing and after storage for 6 months) (mm) | ≥0.30 | 0.35 | 0.52 | 0.52 | 0.45 | 0.35 | 0.35 | 0.32 | 0.25 |
| | (Initial) tensile shear bond stress (after 24 hours) (MPa) | ≥0.10 | 0.18 | 0.24 | 0.24 | 0.20 | 0.05 | 0.05 | 0.12 | 0.10 |
| | (Storage stability) tensile shear bond stress (after 7 days) (MPa) | ≥0.10 | 0.15 | 0.24 | 0.24 | 0.20 | 0.05 | 0.05 | 0.09 | 0.08 |
| | (Long-term storage stability) tensile shear bond stress (after 6 months) (MPa) | ≥0.10 | 0.10 | 0.18 | 0.18 | 0.25 | 0.01 | 0.01 | 0.07 | 0.05 |
| | (Heat resistance, moisture resistance) tensile shear bond displacement (after curing, after exposure to wet and heat) | ≥0.30 | 0.50 | 1.0 | 1.0 | 0.90 | 0.30 | 0.30 | 0.33 | 0.31 |
| | (Heat resistance, moisture resistance) tensile shear bond stress (after curing, after exposure to wet and heat) | ≥0.10 | 0.22 | 0.40 | 0.40 | 0.35 | 0.03 | 0.03 | 0.08 | 0.12 |
| | Thermal Conductivity (W/m · K) | ≥2.0 | 2.20 | 2.20 | 2.20 | 2.20 | 2.20 | 2.20 | 2.20 | 2.20 |
| | (Precipitation suppression) thermal conductivity after 6 months (⅓ of upper portion) | ≥2.0 | 2.15 | 2.10 | 1.98 | 2.15 | 2.15 | 2.15 | 2.15 | 2.15 |
| | (Precipitation suppression) thermal conductivity after 6 months (⅓ of lower portion) | ≥2.0 | 2.25 | 2.30 | 2.42 | 2.25 | 2.25 | 2.25 | 2.25 | 2.25 |
| | Elongation | ≥30% | 50% | 50% | 50% | 40% | 50% | 50% | 50% | 50% |
| | Tensile strength | ≥0.20 MPa | 0.40 | 0.40 | 0.30 | 0.30 | 0.40 | 0.40 | 0.40 | 0.40 |
| | Toroidal amount (ppm) | ≤0.1% | 300 | 300 | 310 | 330 | 300 | 320 | 310 | 300 |

Some or all of the above-described embodiments may be described as the following appendixes, but are not limited to the following description.

APPENDIX 1

A thermally conductive silicone composition containing:

(A) a diorganopolysiloxane having an alkenyl group bonded to a silicon atom;

(B) a diorganopolysiloxane having a hydrogen atom bonded to a silicon atom;

(C) at least one selected from (C-1) an organosilicon compound having two or more groups that are at least one selected from a methoxy group and an ethoxy group and not having a hydrocarbon group having 3 or more carbon atoms or a vinyl group, and (C-2) a hydrolysate of the organosilicon compound (C-1);

(D) an addition catalyst;

(E) a thermally conductive filler; and (F) a condensation catalyst.

APPENDIX 2

The thermally conductive silicone composition according to Appendix 1, wherein the (F) condensation catalyst includes a metal chelate compound containing an alkoxy group.

APPENDIX 3

The thermally conductive silicone composition according to Appendix 1 or 2, further containing (G) a cyclic hydrogenated siloxane having a degree of polymerization of 4 or more and 10 or less.

APPENDIX 4

The thermally conductive silicone composition according to Appendix 3, wherein the component (G) contains (G-1)

1,3,5,7,9-pentamethylcyclopentasiloxane and (G-2) 1,3,5,7,9,11-hexamethylcyclohexasiloxane.

APPENDIX 5

The thermally conductive silicone composition according to any one of Appendixes 1 to 4, containing, relative to 100 parts by mass of a total amount of the component (A) and the component (B), 0.2 parts by mass or more and 5.0 parts by mass or less of the component (C), a catalytic amount of the component (D), 300 parts by mass or more and 2,000 parts by mass or less of the component (E), and a catalytic amount of the component (F), wherein a content of the component (B) is in such a range that a ratio of the number of hydrosilyl groups in the component (B) to the number of alkenyl groups in the component (A) is 1/5 to 7.

APPENDIX 6

The thermally conductive silicone composition according to any one of Appendixes 3 to 5, containing, relative to 100 parts by mass of a total amount of the component (A) and the component (B), 0.01 parts by mass or more and 2.0 parts by mass or less of the component (G).

APPENDIX 7

The thermally conductive silicone composition according to any one of Appendixes 4 to 6, containing, relative to 100 parts by mass of a total amount of the component (A) and the component (B), 0.01 parts by mass or more and 1.0 part by mass or less of the component (G-1), and 0.01 parts by mass or more and 1.0 part by mass or less of the component (G-2).

APPENDIX 8

The thermally conductive silicone composition according to any one of Appendixes 7 to 5, further containing, relative to 100 parts by mass of the total amount of the component (A) and the component (B), 0.05 parts by mass or more and 10.0 parts by mass or less of (H) hydrophobic silica.

APPENDIX 9

The thermally conductive silicone composition according to any one of Appendixes 1 to 8, wherein the component (A) contains 5% by mass or more and 20% by mass or less of an alkenyl group-containing diorganopolysiloxane having at least one silanol group at a molecular chain terminal.

APPENDIX 10

The thermally conductive silicone composition according to any one of Appendixes 1 to 9, wherein the component (E) is at least one selected from aluminum oxide, aluminum hydroxide, magnesium oxide, magnesium hydroxide, zinc oxide, aluminum nitride, and boron nitride.

APPENDIX 11

The thermally conductive silicone composition according to any one of Appendixes 1 to 10, wherein after curing, the thermally conductive silicone composition provides a cured product having a thermal conductivity of 2.0 W/m·K or more and a displacement of 0.3 mm or more measured by a tensile shear bond displacement test described below:

<Tensile Shear Bond Displacement Measurement Test> the thermally conductive silicone composition is placed between an aluminum specimen and an iron specimen subjected to cationic electrodeposition coating such that the coating area is 25 mm in length and 25 mm in width and the thickness is 0.6 mm, and cured at 23° C. for 24 hours, to obtain a specimen for a tensile shear bond test.

The specimen for a tensile shear bond test is subjected to a tensile shear bond test by a method in accordance with JIS K6850, to obtain a graph of S-S curve.

In the graph of S-S curve, the stroke amount at a point where the stress becomes maximum is taken as a displacement of the cured product of the silicone composition corresponding to the specimen for a tensile shear bond test.

APPENDIX 12

A method for producing the thermally conductive silicone composition according to any one of Appendixes 1 to 11, a method for producing a two-component thermally conductive silicone composition including:

a first step of mixing (A) the diorganopolysiloxane having an alkenyl group bonded to a silicon atom, (D) the addition catalyst, (E) the thermally conductive filler, and (F) the condensation catalyst to obtain a first liquid; and a second step of mixing (A) the diorganopolysiloxane having an alkenyl group bonded to a silicon atom, (B) a diorganopolysiloxane having a hydrogen atom bonded to a silicon atom, (C) the at least one selected from (C-1) the organosilicon compound having two or more groups that are at least one selected from a methoxy group and an ethoxy group and not having a hydrocarbon group having 3 or more carbon atoms or a vinyl group, and (C-2) the hydrolysate of the organosilicon compound (C-1), and (E) the thermally conductive filler to obtain a second liquid.

APPENDIX 13

A method for producing a gap filler using the two-component thermally conductive silicone composition according to Appendix 12, the gap filler being disposed between a battery unit housing having an iron surface coated at least in part with a cationic electrodeposition coating and a cooler having an aluminum surface, the method including:

a mixing step of mixing the first liquid and the second liquid to obtain a thermally conductive silicone composition;

an application step of applying the thermally conductive silicone composition to at least one of the battery unit housing and the cooler; and a curing step of the uncured thermally conductive silicone composition applied in the application step at a temperature of 15° C. or higher and 60° C. or lower.

APPENDIX 14

A method for improving adhesive properties of a cured product of a thermally conductive silicone composition containing a thermally conductive filler to a metal or a metal surface coated with a cationic electrodeposition coating material under a vibration condition and improving storage stability of the thermally conductive silicone composition, the method including: adding, to the thermally conductive silicone composition containing (A) a diorganopolysiloxane having an alkenyl group bonded to a silicon atom, (B) a diorganopolysiloxane having a hydrogen atom bonded to a silicon atom, and (D) an addition catalyst, (C) at least one selected from (C-1) an organosilicon compound having two or more groups that are at least one selected from a methoxy group and an ethoxy group and not having a hydrocarbon group having 3 or more carbon atoms or a vinyl group, and (C-2) a hydrolysate of the organosilicon compound (C-1), and (F) a condensation catalyst.

APPENDIX 15

The thermally conductive silicone composition according to any one of Appendixes 1 to 9, wherein a total content of each of octamethylcyclotetrasiloxane (D4), decamethylcyclopentasiloxane (D5) and dodecamethylcyclohexasiloxane (D6), tetradecamethylcycloheptasiloxane (D7), and hexadecamethylcyclooctasiloxane (D8) is less than 0.1 parts by mass relative to 100 parts by mass of the total amount of the components (A) and (B).

The invention claimed is:

1. A two-component thermally conductive silicone composition, comprising:

a first liquid containing (A) a diorganopolysiloxane having an alkenyl group bonded to a silicon atom, (D) an addition catalyst, (E) a thermally conductive filler, and (F) a condensation catalyst;

a second liquid containing (A) the diorganopolysiloxane having an alkenyl group bonded to a silicon atom, (B) a diorganopolysiloxane having a hydrogen atom bonded to a silicon atom, (C) at least one selected from (C-1) an organosilicon compound having two or more groups that are at least one selected from a methoxy group and an ethoxy group and not having a hydrocarbon group having 3 or more carbon atoms or a vinyl group, and (C-2) a hydrolysate of the organosilicon compound (C-1), and (E) the thermally conductive filler;

wherein the composition contains, relative to 100 parts by mass of a total amount of the component (A) and the component (B);

wherein 0.2 parts by mass or more and 5.0 parts by mass or less of the component (C);

wherein a catalytic amount of the component (D) is present;

wherein 300 parts by mass or more and 2,000 parts by mass or less of the component (E); and wherein a catalytic amount of the component (F) is present; and wherein a content of the component (B) is in such a range that a ratio of a number of hydrosilyl groups in the component (B) to a number of alkenyl groups in the component (A) is 1/5 to 7.

2. The two-component thermally conductive silicone composition of claim 1, wherein the (F) condensation catalyst includes a metal chelate compound containing an alkoxy group.

3. The two-component thermally conductive silicone composition of claim 1, further comprising (G) a cyclic hydrogenated siloxane having a degree of polymerization of 4 or more and 10 or less.

4. The two-component thermally conductive silicone composition of claim 3, wherein the composition comprises relative to 100 parts by mass of a total amount of the component (A) and the component (B), 0.01 parts by mass or more and 2.0 parts by mass or less of the component (G).

5. The two-component thermally conductive silicone composition of claim 1, further comprising relative to 100 parts by mass of the total amount of the component (A) and the component (B), 0.05 parts by mass or more and 10.0 parts by mass or less of (H) hydrophobic silica.

6. The two-component thermally conductive silicone composition of claim 1, wherein the component (A) contains 5% by mass or more and 20% by mass or less of an alkenyl group-containing diorganopolysiloxane having at least one silanol group at a molecular chain terminal.

7. The two-component thermally conductive silicone composition of claim 1, wherein the component (E) is at least one selected from aluminum oxide, aluminum hydroxide, magnesium oxide, magnesium hydroxide, zinc oxide, aluminum nitride, and boron nitride.

8. The two-component thermally conductive silicone composition of claim 1, wherein after curing, the thermally conductive silicone composition provides a cured product having a thermal conductivity of 2.0 W/m·K or more and a displacement of 0.3 mm or more measured by a tensile shear bond displacement;

wherein tensile shear bond displacement is determined by the thermally conductive silicone composition being placed between an aluminum specimen and an iron specimen subjected to cationic electrodeposition coating such that a coating area is 25 mm in length and 25 mm in width and a thickness is 0.6 mm, and cured at 23° C. for 24 hours, to obtain a specimen for a tensile shear bond test;

wherein the specimen for a tensile shear bond test is subjected to a tensile shear bond test by a method in accordance with JIS K6850, to obtain a graph of S-S curve; and wherein in the graph of S-S curve, a stroke amount at a point where a stress becomes maximum is taken as a displacement of the cured product of the silicone composition corresponding to the specimen for a tensile shear bond test.

9. The two-component thermally conductive silicone composition of claim 1, wherein the two-component thermally conductive silicone composition is a gap filler.

10. The two-component thermally conductive silicone composition of claim 1, wherein the two-component thermally conductive silicone composition has adhesive properties.

11. A method for producing the two-component thermally conductive silicone composition, comprising:

providing a first liquid containing (A) a diorganopolysiloxane having an alkenyl group bonded to a silicon atom, (D) an addition catalyst, (E) a thermally conductive filler, and (F) a condensation catalyst;

providing a second liquid containing (A) the diorganopolysiloxane having an alkenyl group bonded to a silicon atom, (B) a diorganopolysiloxane having a hydrogen atom bonded to a silicon atom, (C) at least one selected from (C-1) an organosilicon compound having two or more groups that are at least one selected from a methoxy group and an ethoxy group and not having a hydrocarbon group having 3 or more carbon atoms or a vinyl group, and (C-2) a hydrolysate of the organosilicon compound (C-1), and (E) the thermally conductive filler;

wherein in a first step of mixing (A) the diorganopolysiloxane having an alkenyl group bonded to a silicon atom, (D) the addition catalyst, (E) the thermally conductive filler, and (F) the condensation catalyst to obtain a first liquid; and wherein in a second step of mixing (A) the diorganopolysiloxane having an alkenyl group bonded to a silicon atom, (B) the diorganopolysiloxane having a hydrogen atom bonded to a silicon atom, (C) the at least one selected from (C-1) the organosilicon compound having two or more groups that are at least one selected from a methoxy group and an ethoxy group and not having a hydrocarbon group having 3 or more carbon atoms or a vinyl group, and (C-2) the hydrolysate of the organosilicon compound (C-1), and (E) the thermally conductive filler to obtain a second liquid;

wherein the composition contains, in the total amount of the first liquid and the second liquid that constitute the two-component thermally conductive silicone composition;

wherein relative to 100 parts by mass of the total amount of the component (A) and the component (B);

wherein 0.2 parts by mass or more and 5.0 parts by mass or less of the component (C);

wherein a catalytic amount of the component (D) is provided;

wherein 300 parts by mass or more and 2,000 parts by mass or less of the component (E);

wherein a catalytic amount of the component (F) is provided; and wherein the content of the component (B) is in such the range that a ratio of a number of hydrosilyl groups in the component (B) to a number of alkenyl groups in the component (A) is 1/5 to 7.

12. The method for producing the two-component thermally conductive silicone composition of claim 11, wherein the two-component thermally conductive silicone composition is a gap filler.

13. The method for producing the two-component thermally conductive silicone composition of claim 11, wherein the two-component thermally conductive silicone composition has adhesive properties.

14. A method for producing a gap filler using the two-component thermally conductive silicone composition, comprising:

providing a first liquid containing (A) a diorganopolysiloxane having an alkenyl group bonded to a silicon atom, (D) an addition catalyst, (E) a thermally conductive filler, and (F) a condensation catalyst;

providing a second liquid containing (A) the diorganopolysiloxane having an alkenyl group bonded to a silicon atom, (B) a diorganopolysiloxane having a hydrogen atom bonded to a silicon atom, (C) at least one selected from (C-1) an organosilicon compound having two or more groups that are at least one selected from a methoxy group and an ethoxy group and not having a hydrocarbon group having 3 or more carbon atoms or a vinyl group, and (C-2) a hydrolysate of the organosilicon compound (C-1), and (E) the thermally conductive filler;

wherein the composition contains, relative to 100 parts by mass of a total amount of the component (A) and the component (B);

wherein 0.2 parts by mass or more and 5.0 parts by mass or less of the component (C);

wherein a catalytic amount of the component (D) is present;

wherein 300 parts by mass or more and 2,000 parts by mass or less of the component (E); and wherein a catalytic amount of the component (F) is present;

wherein a content of the component (B) is in such a range that a ratio of a number of hydrosilyl groups in the component (B) to a number of alkenyl groups in the component (A) is 1/5 to 7;

wherein the gap filler is disposed between a battery unit housing having an iron surface coated at least in part with a cationic electrodeposition coating and a cooler having an aluminum surface;

wherein a mixing step of mixing the first liquid and the second liquid is performed to obtain a thermally conductive silicone composition;

wherein an application step of applying the thermally conductive silicone composition to at least one of the battery unit housing and the cooler is performed; and wherein a curing step of the uncured thermally conductive silicone composition applied in the application step at a temperature of 15° C. or higher and 60° C. or lower is performed.

15. A method for improving adhesive properties of a cured product of a two-component thermally conductive silicone composition, comprising:

providing a thermally conductive filler to a metal or a metal surface coated with a cationic electrodeposition coating material under a vibration condition and improving storage stability of the thermally conductive silicone composition, the method comprising: separately storing;

providing a first liquid containing (A) a diorganopolysiloxane having an alkenyl group bonded to a silicon atom, (D) an addition catalyst, (E) a thermally conductive filler, and (F) a condensation catalyst;

providing a second liquid containing (A) the diorganopolysiloxane having an alkenyl group bonded to a silicon atom, (B) a diorganopolysiloxane having a hydrogen atom bonded to a silicon atom, (C) at least one selected from (C-1) an organosilicon compound having two or more groups that are at least one selected from a methoxy group and an ethoxy group and not having a hydrocarbon group having 3 or more carbon atoms or a vinyl group, and (C-2) a hydrolysate of the organosilicon compound (C-1), and (E) the thermally conductive filler;

wherein the composition contains, in a total amount of the first liquid and the second liquid that constitute the two-component thermally conductive silicone composition;

wherein relative to 100 parts by mass of a total amount of the component (A) and the component (B);

wherein 0.2 parts by mass or more and 5.0 parts by mass or less of the component (C);

wherein a catalytic amount of the component (D) is provided;

wherein 300 parts by mass or more and 2,000 parts by mass or less of the component (E);

wherein a catalytic amount of the component (F) is provided; and wherein a content of the component (B) is in such a range that a ratio of a number of hydrosilyl groups in the component (B) to a number of alkenyl groups in the component (A) is 1/5 to 7.

* * * * *